US012761037B2

(12) United States Patent
Zhang

(10) Patent No.: US 12,761,037 B2
(45) Date of Patent: Oct. 13, 2026

(54) PATH PLANNING METHOD, SERVER, AND VEHICLE

(71) Applicant: Yinwang Intelligent Technologies Co., Ltd., Shenzhen (CN)

(72) Inventor: Jing Zhang, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 91 days.

(21) Appl. No.: 18/400,046

(22) Filed: Dec. 29, 2023

(65) Prior Publication Data

US 2024/0133706 A1 Apr. 25, 2024
US 2024/0230361 A9 Jul. 11, 2024

Related U.S. Application Data

(63) Continuation of application No. PCT/CN2022/102418, filed on Jun. 29, 2022.

(30) Foreign Application Priority Data

Jun. 30, 2021 (CN) ......................... 202110739529.5

(51) Int. Cl.
*G01C 21/36* (2006.01)

(52) U.S. Cl.
CPC ................................ *G01C 21/3691* (2013.01)

(58) Field of Classification Search
CPC ............ G01C 21/3691; G01C 21/3492; G01C 21/206; G01C 21/343; G01C 21/3423; G01C 21/3815; G08G 1/09; G08G 1/096811; H04W 4/024; H04W 4/40
See application file for complete search history.

(56) References Cited

U.S. PATENT DOCUMENTS

| | | | | |
|---|---|---|---|---|
| 2020/0356115 | A1 | 11/2020 | Kubie | |
| 2021/0209946 | A1 * | 7/2021 | Eilertsen | G08G 1/0969 |

FOREIGN PATENT DOCUMENTS

| | | | | |
|---|---|---|---|---|
| CN | 105788335 | A | | 7/2016 |
| CN | 107782326 | A | | 3/2018 |
| CN | 108062863 | A | | 5/2018 |
| CN | 109840632 | A | | 6/2019 |
| CN | 111060121 | A | * | 4/2020 |

* cited by examiner

*Primary Examiner* — Brian P Sweeney
(74) *Attorney, Agent, or Firm* — Conley Rose, P.C.

(57) ABSTRACT

A path planning method includes a server that obtains a first path. The first path is from a current location of the vehicle to a task destination. The first path includes one or more segments of roads. The server determines planning time information for the vehicle to travel on each of the one or more segments of roads. When the vehicle travels based on the planning time information on each segment of road, a total quantity of vehicles on each segment of road is less than or equal to a capacity of each segment of road. The server sends path information to the vehicle. The path information includes information about at least one of the one or more segments of roads and planning time information for the vehicle to travel on the at least one segment of road.

20 Claims, 9 Drawing Sheets

PATH PLANNING METHOD, SERVER, AND VEHICLE

CROSS-REFERENCE TO RELATED APPLICATIONS

This is a continuation application of International Patent Application No. PCT/CN2022/102418 filed on Jun. 29, 2022, which claims priority to Chinese Patent Application No. 202110739529.5 filed on Jun. 30, 2021. The disclosures of the aforementioned applications are hereby incorporated by reference in their entireties.

TECHNICAL FIELD

This application relates to the field of intelligent driving, and more further, to a path planning method, a server, and a vehicle.

BACKGROUND

Path planning is a common demand in production and life, that is, based on a specified start point and end point and a planning requirement, to calculate an optimal path that meets the requirement.

A conventional path planning technology is divided into two categories. One is a road-level path planning method that is similar to a map and serves a manned vehicle. A driver has highest decision-making power. The map provides several types of optimal paths for the vehicle, and the driver makes a final selection. The driver may alternatively select a path that is different from the paths provided by the map. The other is path planning for an autonomous vehicle. The autonomous vehicle stores a high definition map, and can search for an optimal path based on the high definition map. Autonomous driving of the vehicle is based on a game theory.

The current path planning technology is mainly aimed at the vehicle, and cannot avoid conflicts between vehicles. Therefore, how to implement collaborative path planning between a plurality of vehicles is a problem to be urgently resolved.

SUMMARY

This application provides a path planning method, a server, and a vehicle. This helps avoid conflicts between vehicles, improve passing efficiency of the vehicles, and further help implement orderly operations or passing by the vehicles.

According to a first aspect, a path planning method is provided, including obtaining a first path, where the first path is a path from a current location of a vehicle to a task destination, and the first path includes one or more segments of roads, determining planning time information for the vehicle to travel on each of the one or more segments of roads, so that a total quantity of vehicles on each segment of road is less than or equal to a capacity of each segment of road when the vehicle travels based on the planning time information on each segment of road, and sending path information to the vehicle, where the path information includes information about at least one of the one or more segments of roads and planning time information for the vehicle to travel on the at least one segment of road.

In this embodiment of this application, the path information delivered by the server to the vehicle may include information about one or more segments of roads and planning time information for the vehicle to travel on the one or more segments of roads, to control traveling of the vehicle from two dimensions: a road and time. The server delivers the planning time information, so that a total quantity of vehicles on each segment of road is less than or equal to a capacity of each segment of road when the vehicle travels on each segment of road, to avoid road congestion caused by the total quantity of vehicles being greater than the capacity of the road. This helps avoid conflicts between vehicles, improve passing efficiency of vehicles, and helps implement orderly operations or passing by vehicles.

In some possible implementations, the method includes obtaining a first path, where the first path is a path from a current location of a vehicle to a task destination, and the first path includes one or more segments of roads, determining, based on a capacity of each of the one or more segments of roads, planning time information for the vehicle to travel on each of the one or more segments of roads, and sending path information to the vehicle, where the path information includes information about at least one of the one or more segments of roads and planning time information for the vehicle to travel on the at least one segment of road.

With reference to the first aspect, in some implementations of the first aspect, before obtaining a first path, the method further includes obtaining task information, where the task information includes information indicating the task destination.

In some possible implementations, the method further includes obtaining a second path based on the task destination, where the second path is associated with the first path.

In this embodiment of this application, the server may obtain the second path based on the information that is in the task information and that is used to indicate the task destination, and then obtain information about the first path by using the second path.

In some possible implementations, the first path may be a part of the second path. For example, the task destination indicated in the task information is a first location, and the server may obtain the second path based on the first location. If the server determines that the second path from a start location of the vehicle to the task destination includes a fault point (the fault point is not available to pass through), the server may first deliver information about a third path to the vehicle, where the third path may be a path from the current location of the vehicle to the fault point. The second path may include the third path and the first path, and the first path may be a path from the fault point to the task destination.

After a period of time, if the server determines that the vehicle reaches the fault point and a fault at the fault point is eliminated, the server may deliver path information to the vehicle, where the path information includes information about at least one segment of road in the first path and planning time information for the vehicle to travel on the at least one segment of road.

With reference to the first aspect, in some implementations of the first aspect, the at least one segment of road includes a first road, planning time information for the vehicle to travel on the first road includes information indicating a first moment and information indicating a second moment, the first moment is a moment at which the vehicle enters the first road, and the second moment is a moment at which the vehicle leaves the first road. The method further includes, between the first moment and the second moment, if a total quantity of vehicles on the first road is greater than a capacity of the first road and a priority of the vehicle is higher than that of another vehicle, indicating the other vehicle to leave the first road before the first moment, or indicating the other vehicle to enter the first road after the second moment, where the other vehicle is a vehicle that plans to travel on the first road between the first moment and the second moment.

In this embodiment of this application, when the server determines that a total quantity of vehicles on the first road at a moment is greater than a capacity of the first road, the server may send indication information to a vehicle with a lower priority at the moment, to indicate the vehicle with the lower priority to leave the first road before the first moment, or indicate that a vehicle with the lower priority enters the first road after the second moment. Therefore, a total quantity of vehicles on a road at any moment is less than or equal to a capacity of the road, to avoid conflicts between vehicles, improve passing efficiency of vehicles, and help implement orderly operations or passing by vehicles.

With reference to the first aspect, in some implementations of the first aspect, the planning time information for the vehicle to travel on each segment of road includes a moment at which the vehicle enters each segment of road and a moment at which the vehicle leaves each segment of road, or the planning time information for the vehicle to travel on each segment of road includes a moment at which the vehicle enters each segment of road and velocity information of the vehicle on each segment of road, or the planning time information for the vehicle to travel on each segment of road includes a moment at which the vehicle leaves each segment of road and velocity information of the vehicle on each segment of road.

With reference to the first aspect, in some implementations of the first aspect, the path information further includes information about a driving mode of the vehicle on the at least one segment of road, and the driving mode includes at least one of a straight-line driving mode, a natural turning mode, or a crab mode.

In this embodiment of this application, the server may further indicate information about the driving mode on the at least one segment of road to the vehicle, so that the vehicle can determine the driving mode on each of the at least one segment of road.

With reference to the first aspect, in some implementations of the first aspect, obtaining a first path includes determining, based on a passing class of the vehicle and/or a type of the vehicle, a road on which the vehicle is allowed to travel, where the road on which the vehicle is allowed to travel includes the one or more segments of roads, and obtaining the first path based on the road on which the vehicle is allowed to travel.

In this embodiment of this application, the server may further determine, based on the passing class of the vehicle and/or the type of the vehicle, the road on which the vehicle is allowed to travel. In this way, the server can better plan a feasible path for the vehicle, and avoid that the vehicle travels on a road that does not meet a condition.

In some possible implementations, the method further includes determining a class of the vehicle based on the type of the vehicle, and determining, based on the class of the vehicle, the road on which the vehicle is allowed to travel.

In some possible implementations, a road level of the one or more segments of roads is less than or equal to the passing class of the vehicle.

In some possible implementations, a road level of the one or more segments of roads is less than or equal to the class of the vehicle.

In some possible implementations, when determining that the passing class of the vehicle matches the road level, and/or determining that the type of the vehicle matches the road level, the server may determine the road on which the vehicle is allowed to travel.

With reference to the first aspect, in some implementations of the first aspect, obtaining a first path includes sending information about the task destination to a map server, and obtaining information that is about the first path and that is obtained by the map server based on the task destination.

In this embodiment of this application, when obtaining the task destination of the vehicle, the server may send the task destination to another server, so that the other server plans the first path. The other server may send the information about the first path to the server. In this way, storing map information in the server can be avoided, and storage overheads of the server can be reduced.

With reference to the first aspect, in some implementations of the first aspect, the path information further includes information indicating the vehicle to perform a herringbone U-turn on a second road, and the at least one segment of road includes the second road.

In this embodiment of this application, if the task information obtained by the server includes information indicating that the vehicle needs to perform a herringbone U-turn, the path information delivered by the server to the vehicle may carry the information indicating the vehicle to perform a herringbone U-turn on the second road, so that the vehicle determines to perform a herringbone U-turn on the second road.

According to a second aspect, a path planning method is provided. The method includes that a vehicle sends information of a current location of the vehicle to a server, and the vehicle receives path information sent by the server. The path information includes information about at least one of one or more segments of roads and planning time information in which the vehicle travels on the at least one segment of road, a total quantity of vehicles on each segment of road is less than or equal to a capacity of each segment of road when the vehicle travels based on the planning time information of each of the at least one segment of road, and a first path formed by the one or more segments of roads is a path from the current location of the vehicle to a task destination.

With reference to the second aspect, in some implementations of the second aspect, the at least one segment of road includes a first road, planning time information for the vehicle to travel on the first road includes information indicating a first moment and information indicating a second moment, the first moment is a moment at which the vehicle enters the first road, and the second moment is a moment at which the vehicle leaves the first road. The method further includes that the vehicle receives indication information sent by the server, where the indication information indicates the vehicle to leave the first road before a third moment, or indicates the vehicle to enter the first road after a fourth moment, where another vehicle is a vehicle that plans to travel on the first road between the third moment and the fourth moment, a priority of the other vehicle is greater than or equal to that of the vehicle, and the third moment is the same as the first moment, or the third moment is after the first moment, or the fourth moment is the same as the second moment, or the fourth moment is before the second moment.

In some possible implementations, the indication information may be carried in another piece of path information.

For example, planning time information determined by the server for a vehicle 1 indicates that the vehicle 1 enters the first road at a moment $t_1$ and leaves the first road at a moment $t_2$. Then, planning time information determined by the server for a vehicle 2 indicates that the vehicle 2 enters the first road at a moment $t_3$ and leaves the first road at a moment $t_4$. If the server determines that a capacity of the first road is 1 and the moment $t_3$ is after the moment $t_1$ and before the moment $t_2$, the server may send the indication information to the vehicle 1, where the indication information indicates the vehicle 1 to leave the first road before the moment $t_3$. Alternatively, if the server determines that a capacity of the first road is 1 and the moment $t_4$ is after the moment $t_1$ and before the moment $t_2$, the server may send the indication information to the vehicle 1, where the indication information indicates the vehicle 1 to enter the first road after the moment $t_4$.

With reference to the second aspect, in some implementations of the second aspect, the planning time information for the vehicle to travel on each segment of road includes a moment at which the vehicle enters each segment of road and a moment at which the vehicle leaves each segment of road, or the planning time information for the vehicle to travel on each segment of road includes a moment at which the vehicle enters each segment of road and velocity information of the vehicle on each segment of road, or the planning time information for the vehicle to travel on each segment of road includes a moment at which the vehicle leaves each segment of road and velocity information of the vehicle on each segment of road.

With reference to the second aspect, in some implementations of the second aspect, the method further includes that the vehicle prompts, a user, the planning time information for the vehicle to travel on the at least one segment of road.

In some possible implementations, the vehicle may prompt, to the user by using a sound or a human-machine interaction interface (HMI), the planning time information for the vehicle to travel on the at least one segment of road.

With reference to the second aspect, in some implementations of the second aspect, the path information further includes information about a driving mode of the vehicle on the at least one segment of road, and the driving mode includes at least one of a straight-line driving mode, a natural turning mode, or a crab mode.

With reference to the second aspect, in some implementations of the second aspect, the path information includes information indicating the vehicle to perform a herringbone U-turn on a second road, and the at least one segment of road includes the second road.

With reference to the second aspect, in some implementations of the second aspect, the path information includes first identification information, and before receiving path information sent by the server, the method further includes sending task information to the server, where the task information includes information indicating the task destination, and receiving second identification information sent by the server based on the task information, and the method includes, if the first identification information matches the second identification information, traveling based on the path information.

With reference to the second aspect, in some implementations of the second aspect, the method further includes, if checking the information about the at least one segment of road and/or the planning time information in which the vehicle travels on the at least one segment of road succeeds, traveling based on the path information.

According to a third aspect, an apparatus is provided. The apparatus includes an obtaining unit configured to obtain a first path, where the first path is a path from a current location of a vehicle to a task destination, and the first path includes one or more segments of roads, a determining unit configured to determine planning time information for the vehicle to travel on each of the one or more segments of roads, so that a total quantity of vehicles on each segment of road is less than or equal to a capacity of each segment of road when the vehicle travels based on the planning time information on each segment of road, and a sending unit configured to send path information to the vehicle, where the path information includes information about at least one of the one or more segments of roads and planning time information for the vehicle to travel on the at least one segment of road.

With reference to the third aspect, in some implementations of the third aspect, the obtaining unit is further configured to, before obtaining a first path, obtain task information, where the task information includes information indicating the task destination.

With reference to the third aspect, in some implementations of the third aspect, the at least one segment of road includes a first road, planning time information for the vehicle to travel on the first road includes information indicating a first moment and information indicating a second moment, and the first moment is a moment at which the vehicle enters the first road, and the second moment is a moment at which the vehicle leaves the first road. The sending unit is further configured to, between the first moment and the second moment, if a total quantity of vehicles on the first road is greater than a capacity of the first road and a priority of the vehicle is higher than that of another vehicle, send indication information to the other vehicle, where the indication information indicates the other vehicle to leave the first road before the first moment, or indicates the other vehicle to enter the first road after the second moment, where the other vehicle is a vehicle that plans to travel on the first road between the first moment and the second moment.

With reference to the third aspect, in some implementations of the third aspect, the planning time information for the vehicle to travel on each segment of road includes a moment at which the vehicle enters each segment of road and a moment at which the vehicle leaves each segment of road, or the planning time information for the vehicle to travel on each segment of road includes a moment at which the vehicle enters each segment of road and velocity information of the vehicle on each segment of road, or the planning time information for the vehicle to travel on each segment of road includes a moment at which the vehicle leaves each segment of road and velocity information of the vehicle on each segment of road.

With reference to the third aspect, in some implementations of the third aspect, the path information further includes information about a driving mode of the vehicle on the at least one segment of road, and the driving mode includes at least one of a straight-line driving mode, a natural turning mode, or a crab mode.

With reference to the third aspect, in some implementations of the third aspect, the obtaining unit is further configured to determine, based on a passing class of the vehicle and/or a type of the vehicle, a road on which the vehicle is allowed to travel, where the road on which the vehicle is allowed to travel includes the one or more segments of roads, and obtain the first path based on the road on which the vehicle is allowed to travel.

With reference to the third aspect, in some implementations of the third aspect, the obtaining unit is further configured to send information about the task destination to a map server, and obtain information that is about the first path and that is obtained by the map server based on the task destination.

With reference to the third aspect, in some implementations of the third aspect, the path information further includes information indicating the vehicle to perform a herringbone U-turn on a second road, and the at least one segment of road includes the second road.

According to a fourth aspect, an apparatus is provided. The apparatus includes a sending unit configured to send information of a current location of the apparatus to a server, and a receiving unit configured to receive path information sent by the server. The path information includes information about at least one of one or more segments of roads and planning time information of the apparatus traveling on the at least one segment of road, a total quantity of vehicles on each segment of road is less than or equal to a capacity of each segment of road when the apparatus travels based on the planning time information of each of the at least one segment of road, and a first path formed by the one or more segments of roads is a path from the current location of the apparatus to a task destination.

With reference to the fourth aspect, in some implementations of the fourth aspect, the at least one segment of road includes a first road, planning time information of the apparatus traveling on the first road includes information indicating a first moment and information indicating a second moment, the first moment is a moment at which the apparatus enters the first road, and the second moment is a moment at which the apparatus leaves the first road. The receiving unit is further configured to receive indication information sent by the server, where the indication information indicates the apparatus to leave the first road before a third moment, or indicates the apparatus to enter the first road after a fourth moment, where another vehicle is a vehicle that plans to travel on the first road between the third moment and the fourth moment, a priority of the other vehicle is greater than or equal to that of the apparatus, and the third moment is the same as the first moment, or the third moment is after the first moment, or the fourth moment is the same as the second moment, or the fourth moment is before the second moment.

In some possible implementations, the indication information may be carried in another piece of path information.

With reference to the second aspect, in some implementations of the second aspect, the planning time information of the apparatus traveling on each segment of road includes a moment at which the apparatus enters each segment of road and a moment at which the apparatus leaves each segment of road, or the planning time information of the apparatus traveling on each segment of road includes a moment at which the apparatus enters each segment of road and velocity information of the vehicle on each segment of road, or the planning time information of the apparatus traveling on each segment of road includes a moment at which the apparatus leaves each segment of road and velocity information of the vehicle on each segment of road.

With reference to the fourth aspect, in some implementations of the fourth aspect, the apparatus further includes a prompting unit configured to prompt to a user, the planning time information of the apparatus traveling on the at least one segment of road.

With reference to the fourth aspect, in some implementations of the fourth aspect, the path information further includes information about a driving mode of the apparatus on the at least one segment of road, and the driving mode includes at least one of a straight-line driving mode, a natural turning mode, or a crab mode.

With reference to the fourth aspect, in some implementations of the fourth aspect, the path information includes information indicating the apparatus to perform a herringbone U-turn on a second road, and the at least one segment of road includes the second road.

With reference to the fourth aspect, in some implementations of the fourth aspect, the path information includes first identification information, and the sending unit is further configured to, before receiving the path information sent by the server, send task information to the server, where the task information includes information indicating the task destination, and the receiving unit is further configured to receive second identification information sent by the server based on the task information. The apparatus further includes a check unit configured to, before the apparatus travels based on the path information, determine that the first identification information matches the second identification information.

With reference to the fourth aspect, in some implementations of the fourth aspect, the apparatus further includes a check unit configured to, before the apparatus travels based on the path information, determine that checking of the information about the at least one segment of road and/or the planning time information of the apparatus traveling on the at least one segment of road succeeds.

According to a fifth aspect, an apparatus is provided. The apparatus includes a processing unit and a storage unit, where the storage unit is configured to store instructions, and the processing unit executes the instructions stored in the storage unit, so that the apparatus performs any possible method in the first aspect.

According to a sixth aspect, an apparatus is provided. The apparatus includes a processing unit and a storage unit, where the storage unit is configured to store instructions, and the processing unit executes the instructions stored in the storage unit, so that the apparatus performs any possible method in the second aspect.

According to a seventh aspect, a server is provided, and the server includes the apparatus according to the third aspect or the fifth aspect.

According to an eighth aspect, a vehicle is provided, and the vehicle includes the apparatus according to the fourth aspect or the sixth aspect.

According to a ninth aspect, a computer program product is provided. The computer program product includes computer program code, and when the computer program code runs on a computer, the computer is enabled to perform the method in the first aspect, or when the computer program code runs on a computer, the computer is enabled to perform the method in the second aspect.

It should be noted that all or a part of the computer program code may be stored in a first storage medium. The first storage medium may be encapsulated together with a processor, or may be separately encapsulated with a processor. This is not further limited in embodiments of this application.

According to a tenth aspect, a computer-readable medium is provided. The computer-readable medium stores program code. When the computer program code runs on a computer, the computer is enabled to perform the foregoing method in the first aspect or the second aspect.

According to an eleventh aspect, an embodiment of this application provides a chip system. The chip system includes a processor configured to invoke a computer program or computer instructions stored in a memory, so that the processor performs the method according to any one of the foregoing aspects and the possible designs of any one of the foregoing aspects, or performing the method according to any two of the foregoing aspects and the possible design of any one of the foregoing aspects.

With reference to the eleventh aspect, in a possible implementation, the processor is coupled to the memory through an interface.

With reference to the eleventh aspect, in a possible implementation, the chip system further includes the memory, and the memory stores the computer program or the computer instructions.

According to a twelfth aspect, an embodiment of this application provides a processor. The processor is configured to invoke a computer program or computer instructions stored in a memory, so that the processor performs the method according to any one of the foregoing aspects and the possible designs of any one of the foregoing aspects, or performs the method according to any two of the foregoing aspects and the possible design of any one of the foregoing aspects.

According to a thirteenth aspect, an embodiment of this application provides a vehicle control system. The system includes the apparatus according to the third aspect.

DESCRIPTION OF EMBODIMENTS

The following describes the technical solutions in this application with reference to the accompanying drawings.

Figure 1:
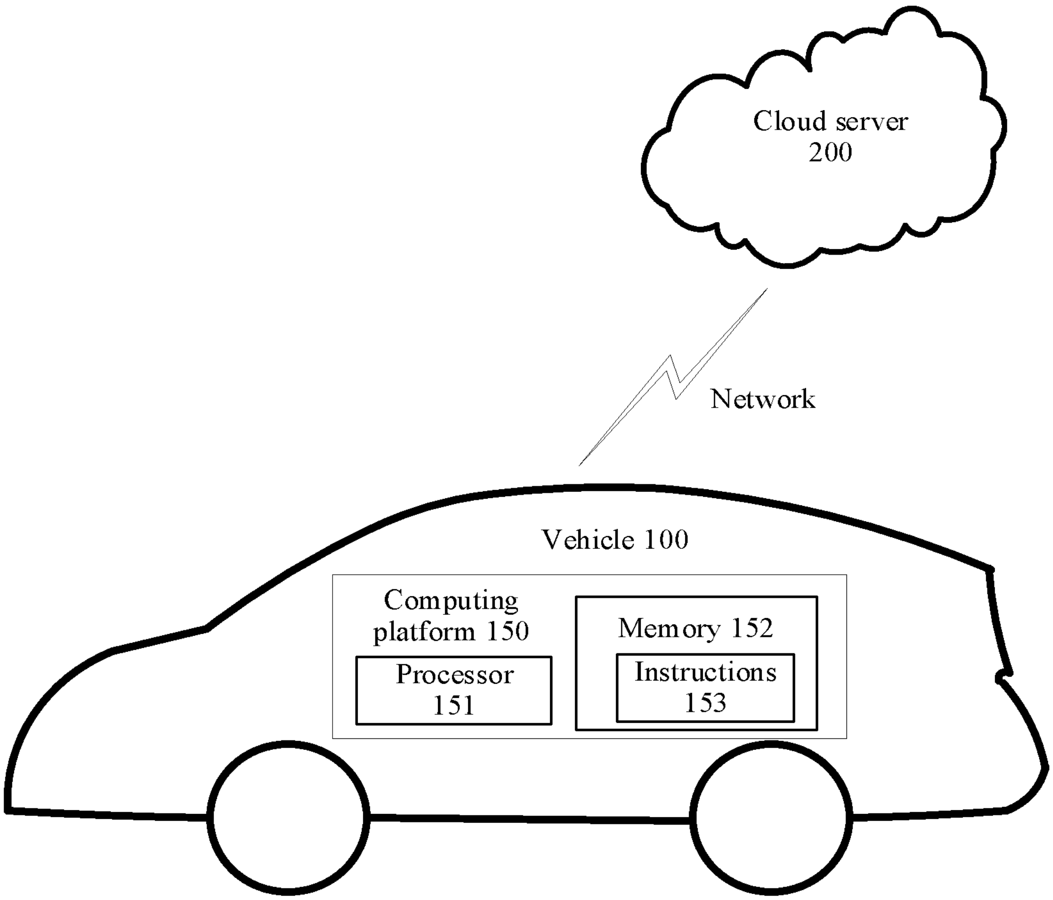
FIG. 1 shows an application scenario of a path planning method according to an embodiment of this application.

FIG. 1 shows an application scenario of a path planning method according to an embodiment of this application. In this application scenario, a vehicle 100 and a cloud server 200 may be included. The vehicle 100 and the cloud server 200 may communicate with each other through a network.

Some or all of functions of the vehicle 100 are controlled by a computing platform 150. The computing platform 150 may include at least one processor 151, and the processor 151 may execute instructions 153 stored in a non-transient computer-readable medium like a memory 152. In some embodiments, the computing platform 150 may alternatively be a plurality of computing devices that control individual components or subsystems of the vehicle 100 in a distributed manner. The processor 151 may be any conventional processor, like a central processing unit (CPU). Alternatively, the processor 151 may further include, for example, a graphics processing unit (GPU), a field-programmable gate array (FPGA), a system-on-a-chip (SOC), an application-specific integrated circuit (ASIC) or a combination thereof.

In addition to the instructions 153, the memory 152 may alternatively store data, such as a road map, route information, a vehicle's location, direction, velocity, and other such vehicle data, as well as other information. Such information may be used by the vehicle 100 and the computing platform 150 during operation of the vehicle 100 in autonomous, semi-autonomous and/or manual modes.

It should be understood that a structure of a vehicle in FIG. 1 should not be construed as a limitation on embodiments of this application.

Optionally, the vehicle 100 may be a car, a truck, a motorcycle, a bus, a boat, an airplane, a helicopter, a lawn mower, a recreational vehicle, a playground vehicle, a construction device, a trolley, a golf cart, a train, or the like. This is not particularly limited in embodiments of this application.

In addition, the application scenario shown in FIG. 1 may further include a cloud server. In an embodiment of this application, the cloud server may carry road information and planning time information when the vehicle travels on the road to path information delivered by the cloud server to the vehicle. The server delivers the planning time information, so that a total quantity of vehicles on each segment of road when the vehicle travels on each segment of road is less than or equal to a capacity of each segment of road, to avoid road congestion caused by the total quantity of vehicles being greater than the capacity of the road. This helps avoid conflicts between vehicles.

In an embodiment, the cloud server may alternatively be implemented by using a virtual machine.

As described above, a conventional path planning technology of the vehicle is divided into two categories. One is a road-level path planning method that is similar to a map and serves a manned vehicle. A driver has highest decision-making power. The map provides several types of optimal paths for the vehicle, and the driver makes a final selection. The driver may alternatively select a path that is different from the paths provided by the map. The other is path planning for an autonomous vehicle. The autonomous vehicle stores a high definition map, and can search for an optimal path based on the high definition map. Autonomous driving of the vehicle is based on a game theory. The current path planning technology is mainly aimed at the vehicle, and cannot avoid conflicts between vehicles.

In view of this, embodiments of this application provide a path planning method and a server, to cooperatively allocate road resources and time resources to a plurality of vehicles, and carry information such as a location and time to the path information delivered to the vehicle, to implement strong control on the vehicle. The server delivers the planning time information, so that a total quantity of vehicles on each segment of road when the vehicle travels on each segment of road is less than or equal to a capacity of each segment of road, to avoid road congestion caused by the total quantity of vehicles being greater than the capacity of the road, and this helps avoid conflicts between vehicles. Finally, orderly passing or operations by the vehicles is implemented, which can improve passing or operation efficiency of the vehicle and reduce manual operation costs. The technical solutions in embodiments of this application may be applied to an autonomous driving scenario like a port, a mine, or a closed campus, or may be applied to an urban road passing scenario. A specific application scenario is not limited in embodiments of this application.

Figure 2:
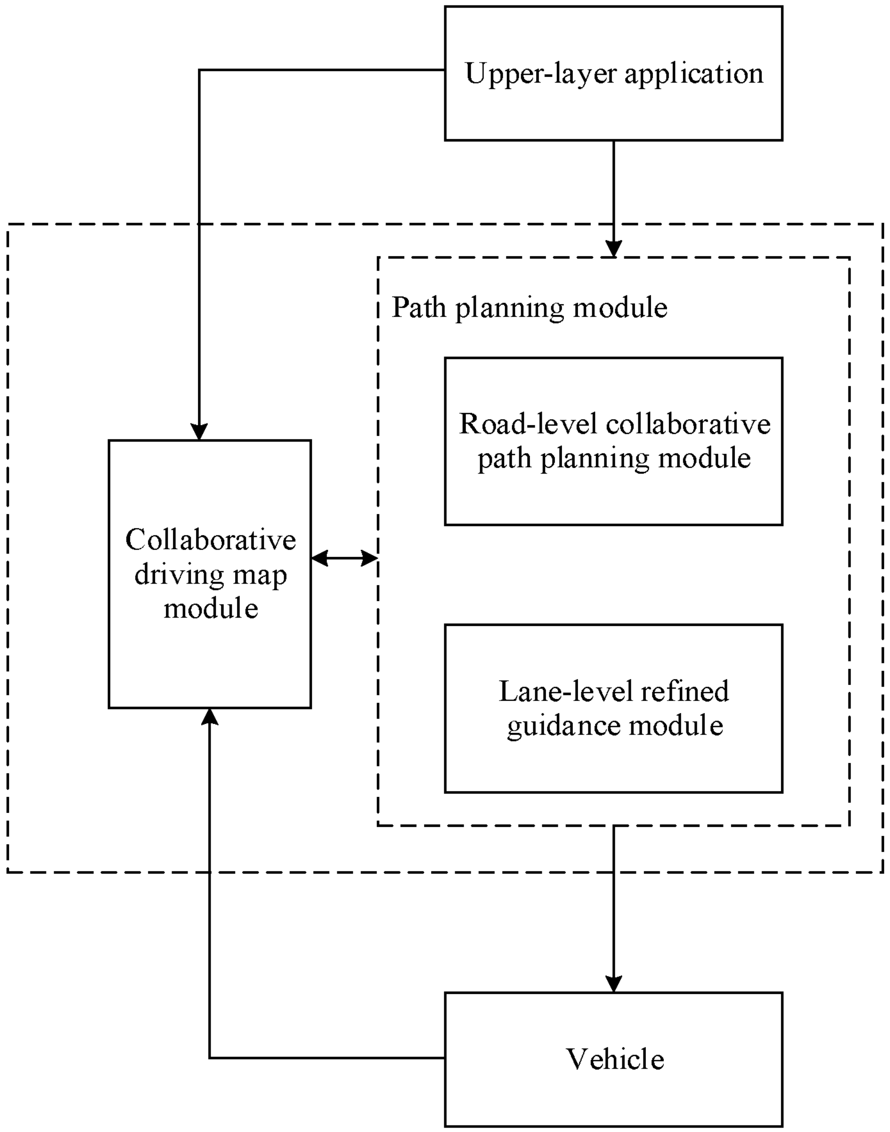
FIG. 2 is a schematic block diagram of a system according to an embodiment of this application.

FIG. 2 is a schematic block diagram of a system according to an embodiment of this application. The system includes an upper-layer application (or platform), a collaborative driving map module, a road-level collaborative path planning module, a lane-level refined guidance module, and a vehicle. The upper-layer application may be deployed on a server or may be deployed on a vehicle, and may receive a user input through a user interface (UI), for example, settings on task information, road information, and lane information. The collaborative driving map module, the road-level collaborative path planning module, and the lane-level refined guidance module may belong to a collaborative driving system, and the collaborative driving system connects to the server upwards, and connects to the vehicle downwards.

A road may usually include one or more lanes. A road-level path may indicate that a vehicle travels on a corresponding road, and is mainly used to indicate a driving direction at an intersection, and generally does not restrict a specific behavior of the vehicle on the road. A lane-level path may require the vehicle to travel on a specific lane of the road, and the vehicle is not allowed to overtake, change lanes, or drive across lanes at will.

It should be understood that the collaborative driving map module, the road-level collaborative path planning module, and the lane-level refined guidance module may belong to a same server (for example, the collaborative driving system). Alternatively, the collaborative driving map module may belong to a server, and the road-level collaborative path planning module and the lane-level refined guidance module may belong to another server. Alternatively, the collaborative driving map module, the road-level collaborative path planning module, and the lane-level refined guidance module may be different modules, or may be two modules, or may be one module, or some module functions may be deployed in another server or another system. This is not limited in embodiments of this application. It may be understood that when the upper-layer application is deployed on the server, the upper-layer application and one or more of collaborative driving map modules, the road-level collaborative path planning module, and the lane-level refined guidance module may be deployed on the same server, or may be deployed on different servers.

The upper-layer application (or platform) may provide attributes of the road and the lane for the collaborative driving map module, where the attributes include but are not limited to:

(1) Passable Attribute of the Road:

The passable attribute of the road may be understood that whether the road is passable or a condition that needs to be met when the road is passable. A passable condition of the road may be determined based on one or more of the following: a destination of the vehicle, a task type of the vehicle, a type of the vehicle, and the like. For example, a road is passable under any circumstance. For another example, only a vehicle whose final destination is on the road is passable, and this circumstance is common in a production environment. If there is a production device on a road, only vehicles that need to perform operations on the road can enter the road. It can also be said that the task type of the vehicle matches an operation type on the road, and another vehicle can only choose to bypass. For another example, only specific types of vehicles, such as a special vehicle, a fire truck, an ambulance, can pass the road.

The passable attribute of the road may alternatively include a road level. In a possible implementation, types of the vehicle also separately correspond to corresponding vehicle levels. When a vehicle level is higher than or equal to the road level, the vehicle can travel on the road. For example, the road level is 0 to 3, where level 0 has no requirement on the vehicle type, that is, all vehicles can travel on the road. Different types of the vehicle correspond to different levels, and a level of a common vehicle is level 1. The common vehicle can travel on a road with the road level of 0 or 1, but cannot travel on a road with the road level of 2 or 3. The special vehicle has a higher level, for example, the levels of the fire truck and the ambulance are 3, and the fire truck and the ambulance can travel on all roads. For another example, for a type of vehicle, a vehicle level is 2. Then this type of vehicle can travel on roads with the road level 0 to 2, but cannot travel on a road with the road level 3 or a road with the road level greater than 3.

In still another possible implementation, when the upper-layer application (or the platform) delivers the task information of the vehicle or the vehicle uploads the task information, the upper-layer application (or the platform) may carry the passing class of the vehicle in the task information. When the passing class of the vehicle is higher than or equal to the road level, the vehicle can travel on the road. For example, if the passing class of the vehicle is 2, the vehicle can travel on roads with the road level 0 to 2, but cannot travel on a road with the road level 3 or a road with the road level greater than 3. For another example, if the passing class of the vehicle is 5 and a highest road level is also 5, the server may select, from all roads, a path from a current location to a task destination for the vehicle.

The passable attribute of the road may be determined based on one or more of the passing class of the vehicle, the type of the vehicle, the task type of the vehicle, the task destination of the vehicle, and the like. Therefore, when a path is planned, correspondingly, a road on which the vehicle is allowed to travel may be determined.

(2) Availability Status of the Road and the Lane:

The availability status of the road and the lane can be understood as whether the road and the lane are passable. This is irrelevant to the vehicle and the task, and generally, the road and the lane are closed due to a safety problem. When the safety problem is solved, a related road and lane can be opened.

(3) Capacity of the Road:

The capacity of the road can be used as a reference to determine time resource allocation in multi-vehicle system path planning.

The capacity of the road refers to an upper limit of a quantity of vehicles that can be located on the road for a road or a segment of road at a same moment. The time resource allocation based on the capacity of the road can prevent lockout or efficiency reduction caused by vehicle clustering.

The capacity of the road may be related to a length, a width, a quantity of lanes, and the like of the road. For example, the larger a quantity of lanes of the road are, the larger the capacity of the road is, or the capacity of the road may be related to a service attribute of the road, or the capacity of the road may alternatively be related to a guidance capability of the upper-layer application. For example, a stronger capability of the upper-layer application indicates that vehicles on the road may be denser, and lockout or a like case does not occur.

(4) Type of the Lane:

The type of the lane may be related to a service requirement, and is generally classified into a working lane and an overtaking lane. To be specific, a vehicle that needs to perform an operation on the working lane can travel on the working lane. A vehicle passing only through the road can travel on the overtaking lane of the road.

In addition, road attributes may be set for some special requirements or scenarios. For example, in a port scenario, the vehicle has a herringbone U-turn function. For some special tasks, the vehicle needs to perform a herringbone U-turn in a proper location. When allocating a road resource to the vehicle, whether the road supports the herringbone U-turn needs to be checked.

Figure 3:
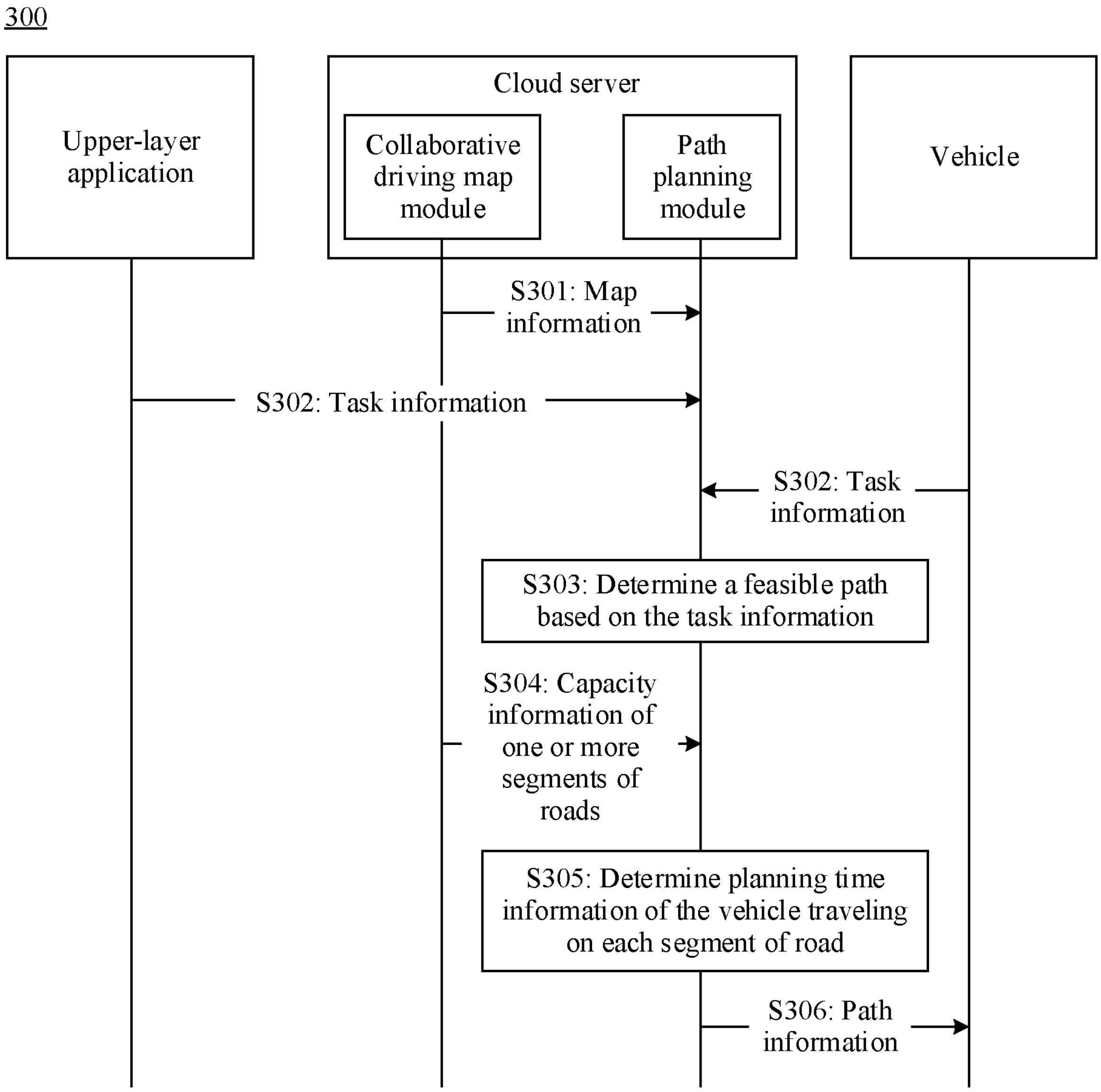
FIG. 3 is a schematic flowchart of a path planning method according to an embodiment of this application.

FIG. 3 is a schematic flowchart of a path planning method 300 according to an embodiment of this application. The method may be performed by a vehicle, a cloud server, and an upper-layer application (or a platform), where the cloud server includes a path planning module and a collaborative driving map module. The method 300 includes the following.

S301: The path planning module obtains map information sent by the collaborative driving map module, where the map information may include a topological relationship of a road.

It should be understood that the path planning module may include the road-level collaborative path planning module and the lane-level refined guidance module shown in FIG. 2, and the collaborative driving map module may be the collaborative driving map module shown in FIG. 2.

It should be further understood that, that the path planning module obtains map information sent by the collaborative driving map module may be that a path planning module in a cloud server a obtains map information from a collaborative driving map module in a cloud server b, or a path planning module in a cloud server a obtains map information from a collaborative driving map module in the cloud server a. In FIG. 3, an example in which the path planning module and the collaborative driving map module are located on a same cloud server is used for description.

The map information includes a topological relationship of a map road network, that is, an upstream and downstream relationship of the road. A feasible path from a start point to an end point can be planned based on the topological relationship of the road.

In an embodiment, after obtaining the map information from the collaborative driving map module, the path planning module may store the map information in the path planning module. In this case, after receiving task information next time, the path planning module does not need to obtain the map information from the collaborative map module.

S302: The path planning module obtains the task information.

In an embodiment, the path planning module may obtain the task information from the upper-layer application (or platform). For example, in scenarios such as a port, a mine, or a closed campus, a dispatch center in a zone may deliver the task information of the vehicle to the cloud server, and request the cloud server to plan a path for the vehicle.

In an embodiment, the path planning module may alternatively obtain the task information from the vehicle. For example, in an urban passing scenario, when the vehicle travels, an operation of a driver may trigger the vehicle to upload the task information to the cloud server and apply for path planning.

In an embodiment, the task information may include static information and dynamic information. The static information includes but is not limited to a task destination, a passing class, an inherent attribute of the vehicle, and the like. The task destination, the passing class, and the inherent attribute of the vehicle may all be used in combination with a passable attribute of the road, and whether the vehicle is allowed to pass is determined according to a passing rule of the road. For example, when the passing class is greater than a road level of a road or a segment of road, the vehicle can pass on this road or this segment of road. The inherent attribute of the vehicle may include one or more of the following: a vehicle type, dimension information such as a height of the vehicle and a width of the vehicle, maneuvering capability information such as a minimum turning radius and a maximum climbing slope, and license plate information (some scenarios where traffic is restricted based on a license plate, for example, a last number of the license plate or a region or province to which the vehicle belongs). Based on the information, it can be determined from a perspective of a vehicle whether a road can meet a driving condition of the vehicle, for example, a large vehicle is not allowed to pass, a height limit, a width limit, an excessively sharp turning, or a steep slope. The static information is mainly used to allocate a space resource (road resource) to a vehicle.

In an embodiment, the task information sent to the server in a process in which the vehicle travels in the urban scenario may include the task destination and the inherent attribute of the vehicle.

In an embodiment, the task information may alternatively not include the task destination but include a task purpose. For example, when the task purpose is charging and a location of a charging pile is not specified in the task information, the cloud server may select an available charging pile for the vehicle. The cloud server may send navigation information to the vehicle, where the navigation information may include a task identifier (ID) and the task destination, and the task ID is used by the vehicle to check whether the path information is correct.

The dynamic information may include a task priority of the vehicle, and is mainly used to allocate a time resource to the vehicle. Different from the static information, the dynamic information affects not only the vehicle to which the dynamic information belongs, but also affect another related vehicle. For example, when two or more vehicles simultaneously travel on a road, a time window of each vehicle on each segment of road is allocated to the two or more vehicles based on task priorities of the two or more vehicles. A higher priority indicates a higher weight when time resources are allocated, that is, a task requirement of a high-priority vehicle is met. When time resource allocation of two vehicles conflicts, time of a low-priority vehicle is usually adjusted.

For example, capacity of a road is 1, and the vehicle with a high task priority needs to enter the road at a moment $T_1$ and leave the road at a moment $T_2$. At this point, if another vehicle with a lower task priority is ready to enter the road at a moment $T_3$ ($T_3$ may be a moment between $T_1$ and $T_2$), a cloud may indicate the vehicle to reduce the speed, to ensure that the vehicle enters the road after the moment $T_2$.

In an embodiment, the task priority of the vehicle may be obtained from the dynamic information, or may be obtained from the static information. For example, the inherent attribute of the vehicle in the static information may include a vehicle type. For example, the cloud server may store a correspondence between a vehicle type and a task priority of the vehicle. For example, special vehicles such as an ambulance or a fire truck corresponds to a highest task priority.

S303: The path planning module determines a feasible path based on the task information, where the feasible path includes one or more segments of roads.

In an embodiment, the path planning module may determine the feasible path based on the static information in the task information and inherent attributes of the road and a lane.

For example, the road type and a lane type may include the inherent attributes of the road and the lane, for example, a width, a slope, and a curvature. This type of attribute can be obtained through capture by a high definition map and updated during road renovation. The path planning module may determine the feasible path by combining the inherent attribute of the vehicle and the inherent attributes of the road and the lane. For example, a slope of each of the one or more segments of roads needs to be less than or equal to the maximum climbing slope of the vehicle. For another example, a width of a lane in each of the one or more segments of roads needs to be greater than or equal to the width of the vehicle.

In an embodiment, the path planning module may determine the feasible path based on the static information in the task information and service attributes of the road and the lane.

For example, the service attributes of the road and the lane may include the passable attribute, a steerable attribute, and a dedicated road lane attribute (for example, a dedicated bus lane) of the road. The path planning module may determine the feasible path based on the passing class in the static information and the road level in the passable attribute of the road. A road level of each of the one or more segments of roads is less than or equal to the passing class.

In an embodiment, the path planning module may determine the feasible path based on the static information in the task information and availability statuses of the road and the lane.

For example, the availability statuses of the road and the lane may be described by using OPEN and CLOSE. For example, in a production operation scenario, if a vehicle breaks down or an object falls off from the vehicle, to ensure safety of the vehicle, a related zone needs to be prohibited, so that an availability status of a corresponding road or lane is set to CLOSE. In an urban environment, a related road and lane are surrounded by guardrails for reasons such as road repair, so that the availability status of the corresponding road or lane is set to CLOSE. The path planning module may determine that the availability status of each of the one or more segments of roads may be OPEN.

It should be understood that the service attributes of the road or the lane may be set according to a service requirement by invoking a map interface.

It should be further understood that the path planning module may determine the feasible path with reference to the task information and a plurality of parameters. The plurality of parameters may include at least two of the inherent attributes of the road and the lane, the service attributes of the road and the lane, and the availability statuses of the road and the lane.

In an embodiment, the path planning module may alternatively not obtain the map information from the collaborative driving map module, but send, after obtaining the task information, the task destination in the task information or a task destination planned based on a task purpose in the task information to the collaborative driving map module. The collaborative driving map module may plan the feasible path for the vehicle based on current location information of the vehicle and the task destination, and send information about the feasible path to the path planning module. In this way, the map information does not need to be stored in the path planning module, and this helps reduce storage overheads in the path planning module.

S304: The path planning module obtains capacity information of each of the one or more segments of roads from the collaborative driving map module.

S305: Determine, based on the capacity information of each segment of road, planning time information for the vehicle to travel on each segment of road.

Figure 4:
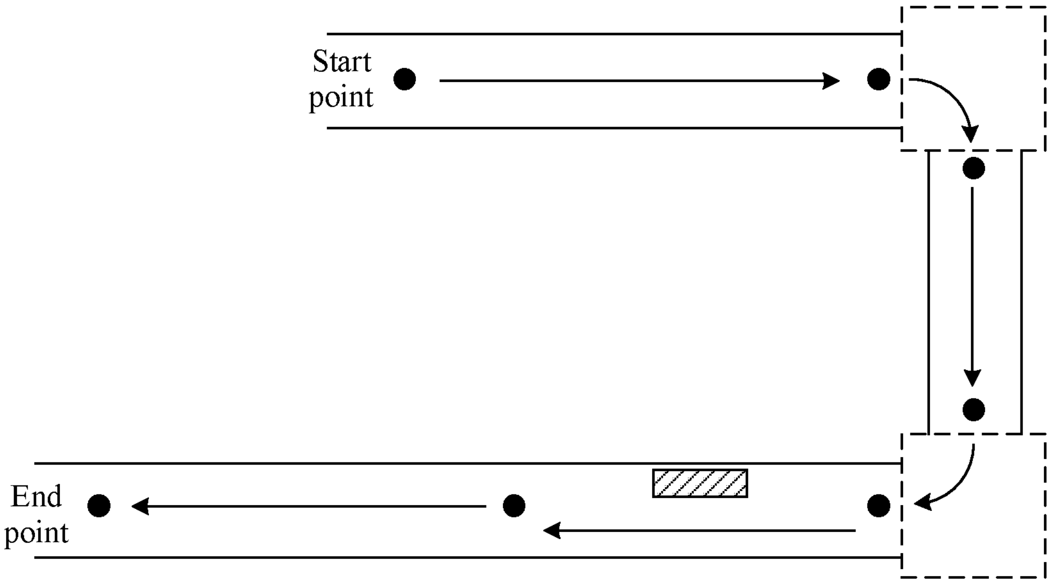
FIG. 4 is a schematic diagram of road segments and key nodes according to an embodiment of this application.

To implement multi-vehicle collaborative path planning, time resources can be allocated to each vehicle. Time resource allocation needs to meet a capacity constraint. FIG. 4 shows a schematic diagram of road segments and key nodes.

An object of capacity description is a road or a segment of road. As shown in FIG. 3, black dots are the key nodes. There is a road or a segment of road between two key nodes, and a capacity of the road or the segment of road may be described by using a same parameter. For example, a start point and an end point of a road may be the key nodes. For a short road, capacity of the entire road can be described by using one road capacity. For a long road, a key node needs to be added in an appropriate location to improve management efficiency. For example, because a length of a third road shown in FIG. 3 is long, a key node is set at an appropriate location, and the third road is divided into a plurality of segments, and each segment has a capacity.

Figure 5:
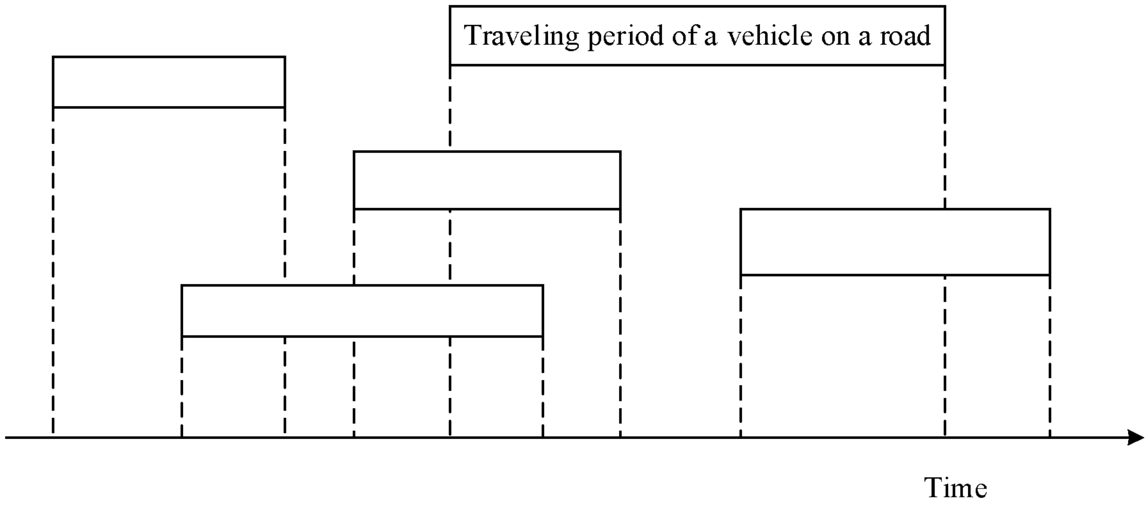
FIG. 5 is a schematic diagram of allocating a time resource to one road or a segment of road according to an embodiment of this application.

When allocating a time resource to the vehicle, the path planning module may plan time of arrival for each key node based on all roads that the vehicle passes through and a road capacity of each segment of road. FIG. 5 is a schematic diagram of allocating a time resource to one road or one segment of road. As shown in FIG. 5, a horizontal axis represents time, each rectangular box represents a time window in which a vehicle passes through the road or the segment of road, and a moment corresponding to a left side of the rectangular box is a moment at which the vehicle arrives at a start point of the road. A moment corresponding to a right side of the rectangular box is a moment at which the vehicle arrives at an end point of the road. Viewed from the time axis, at any moment, a quantity of corresponding rectangular boxes does not exceed three, that is, at any moment, a quantity of vehicles on the road does not exceed three. If the capacity of the road is 3 or greater than 3, the time resource allocation result meets a capacity requirement.

If the capacity requirement is not met (for example, a quantity of vehicles on the road at a moment is greater than the capacity of the road), the path planning module may sort vehicles based on a task priority. A time window of a vehicle with a lower priority is adjusted, for example, a moment at which the vehicle enters the road is delayed, or a moment at which the vehicle leaves the road is advanced.

After a space resource and a time resource are allocated to the vehicle, detailed path information may be planned for the vehicle. For example, the path information sent by the path planning module to the vehicle may be described by using a series of point sets, and the points may include but are not limited to the following types of information.

(1) Location Information:

The location information is general information. The location information may be described by using coordinates of a point, or may be described by using road and lane IDs.

The coordinates of the point may be described by using a longitude and a latitude. Alternatively, the coordinates of the point may alternatively be described by using coordinates in a local coordinate system. For example, in a port scenario, a coordinate system may be established for the port. The coordinate system may be stored in a cloud server and a vehicle. After receiving coordinates of a point in the coordinate system, the vehicle may determine location information of the point.

mode may be used. For example, when the vehicle needs to change lanes across a plurality of lanes, the natural turning mode may be used.

S306: The path planning module sends the path information to the vehicle, where the path information includes the information about the one or more segments of roads and the planning time information for the vehicle to travel on the one or more segments of roads.

Figure 8:
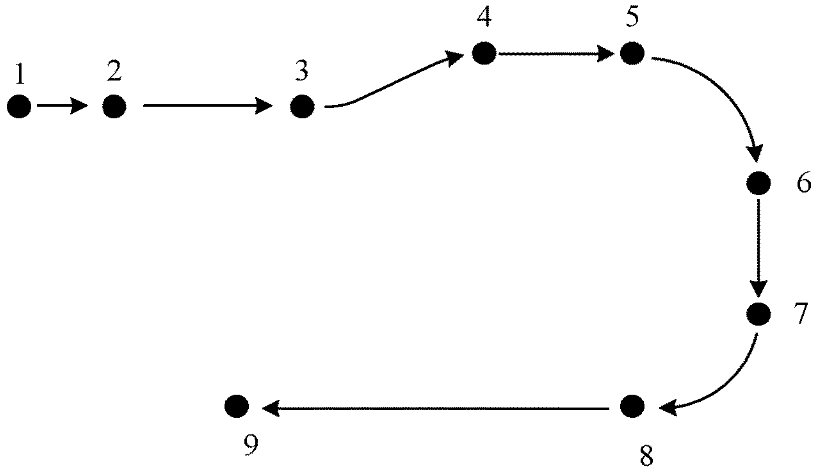
FIG. 8 is a schematic diagram in which a path planning module delivers path information to a vehicle according to an embodiment of this application.

For example, FIG. 8 is a schematic diagram in which a path planning module delivers path information to a vehicle according to an embodiment of this application. The path information shown in FIG. 8 includes critical path points 1 to 9. At each critical path point, there is usually a change in velocity or a driving mode. Critical path points 1 to 5 shown in FIG. 8 are used as an example. Information about the five critical path points may be shown in Table 1.

TABLE 1

| Information about critical path points | | | | | |
|---|---|---|---|---|---|
| Critical path point | 1 | 2 | 3 | 4 | 5 |
| Location | $P_1$ | $P_2$ | $P_3$ | $P_4$ | $P_5$ |
| Velocity | 0 | $v_1$ | $v_1$/NULL | $v_1$/NULL | $v_2$ |
| Time of arrival | $t_1$ | $t_2$ | $t_3$ | $t_4$ | $t_5$ |
| Driving mode | STRAIGHT | STRAIGHT/NULL | LANE CHANGE | STRAIGHT | TURN |

(2) Velocity and Time Information:

The velocity and time information indicate that the vehicle reaches a corresponding path point at a specified time in a planned path during a driving process. Through such information, space and time consistency can be ensured, and the vehicle can effectively drive according to a path point delivered by the cloud server, and this ensures planning effectiveness of the cloud server.

(3) Driving Modes of the Vehicle:

To adapt to different operating environments, a commercial vehicle may have more driving modes (or control modes) than a passenger vehicle. Two common driving modes include a natural turning mode and a crab mode.

Figure 6:
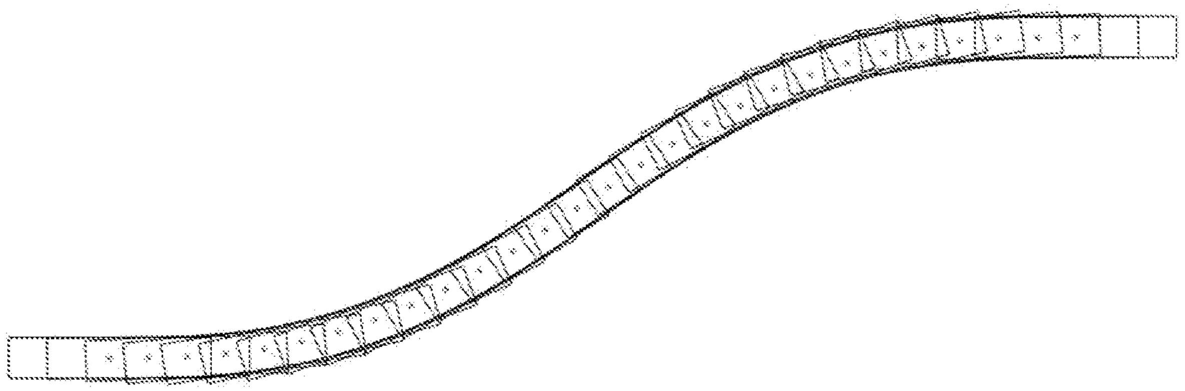
FIG. 6 is a schematic diagram of a natural turning mode.

FIG. 6 is a schematic diagram of a natural turning mode. The natural turning mode is a common turning mode, and this mode is used by most passenger vehicles.

In an embodiment, the natural turning mode may further include three submodes. A first submode may be that front and rear wheels rotate in different directions together, a second submode may be that front wheels rotate and rear wheels do not rotate, and a third submode may be that rear wheels do not rotate and front wheels rotate.

Figure 7:
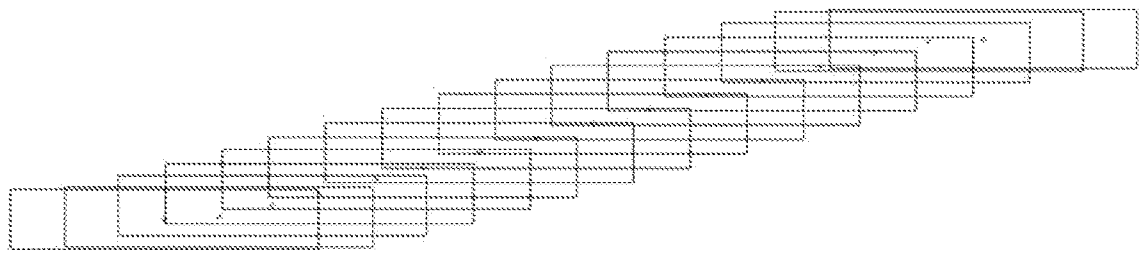
FIG. 7 is a schematic diagram of a crab mode.

FIG. 7 is a schematic diagram of a crab mode. The crab mode is a unique mode of a type of commercial vehicle. In the crab mode, front and rear wheels of a vehicle rotate in a same direction at the same time, and a yawing angle of the vehicle remains unchanged during lane change, and a vehicle body sweeps a smaller area. However, in this mode, yawing angles of a front lane and a rear lane are the same, and this is not as flexible as the natural turning mode and is often used in a lane change scenario.

A cloud server has more complete information than a vehicle. Therefore, setting a driving mode for the vehicle by using the cloud server can help the vehicle more effectively complete path tracking. Considerations of driving modes include whether yawing angles before and after lane change is consistent, a variable lane length, obstacle information, and the like. For example, if requirements of yawing angles of a lane before and after lane change are consistent, the crab The STRAIGHT indicates a straight mode, the LANE CHANGE indicates a crab mode, and the TURN indicates a natural turning mode.

A critical path point 1 is a start point of an entire path, so its velocity is 0. A path from the critical path point 1 to a critical path point 2 is an acceleration path, and a path from the critical path point 2 to a critical path point 3 is a constant path. Therefore, the critical path point 2 is used as a boundary, and velocity modes on both sides of the critical path point 2 are different, so that the critical path point 2 is a key node. In addition, because the critical path point 2 to the critical path point 3 is at the constant path, velocity of a vehicle at the critical path point 3 is consistent with that at the critical path point 2. In this case, velocity information of the critical path point 3 may not be provided, and velocity information of the critical path point 2 is directly inherited. The critical path point 3 is used as a boundary, before which is a straight line and after which is a crab lane change. Therefore, the critical path point 3 is also a key node. Similarly, the driving mode has an inherited feature.

In an embodiment, the path information further includes a task ID. The vehicle may match the task ID in the path information with a task ID in navigation information. If the matching succeeds, the vehicle may determine that the path information is task information for the vehicle.

In an embodiment of this application, when delivering location information to the vehicle, a cloud server also delivers time information, and controls driving of the vehicle from two dimensions: a space dimension and a time dimension. This ensures effectiveness of multi-vehicle collaborative path planning by the cloud server, avoids conflicts between vehicles, and effectively improves efficiency of vehicle operations or passing.

Figure 9:
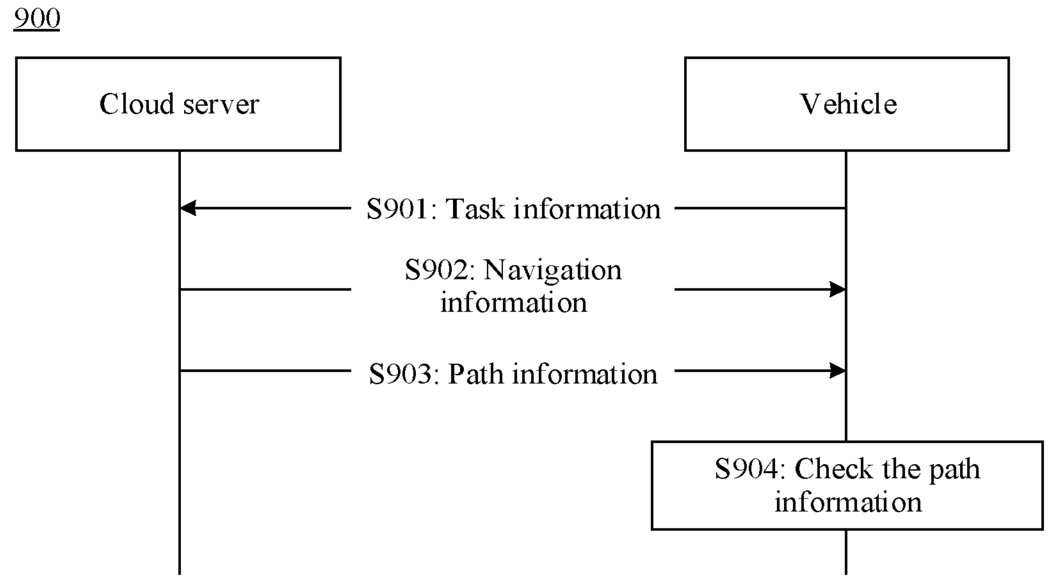
FIG. 9 is a schematic flowchart of a path planning method according to an embodiment of this application.

FIG. 9 is a schematic flowchart of a path planning method 900 according to an embodiment of this application. The method may be performed by a vehicle and a cloud server, where the cloud server includes a path planning module and a collaborative driving map module. The method 900 includes the following steps.

S901: The vehicle sends task information to the cloud server.

It should be understood that for a description of the task information, refer to the description in the foregoing embodiments. Details are not described herein again.

S902: The cloud server sends navigation information to the vehicle based on the task information.

After receiving the task information, the cloud server first determines whether the task information is valid. If the task information is valid, the cloud server generates a task ID, and the task ID is used to distinguish tasks of other vehicles and perform matching during path delivery. If the task information is not valid, the cloud server rejects a path planning application. If no end point is specified for the task, an end point is selected for the task based on a task purpose. For example, if the task purpose is charging and no charging pile is specified, a cloud can select an available charging pile for the task. Finally, the cloud sends the navigation information to a vehicle end.

In this embodiment of this application, considering that a final destination in path information delivered by the cloud server may be inconsistent with a task destination in the task information (for example, if the task destination carried in the task information is a location a, and the cloud server determines that there is an obstacle in a feasible path from a current location of the vehicle to the location a, the cloud server may carry information that the final destination is a temporary parking location b in the path information delivered to the vehicle), the vehicle needs to determine, by using a task ID in the navigation information and a task ID in the path information, that the path information is actually the path information for the vehicle, so that the vehicle may execute an operation or a driving task based on the path information delivered by the vehicle.

S903: The cloud server sends the path information to the vehicle.

It should be understood that, for a process in which the cloud server determines the path information based on the task information, refer to the description in the foregoing embodiments. Details are not described herein again.

S904: The vehicle checks the path information.

When receiving the path information, the vehicle may check whether the path information is correct. If the path information is incorrect, the vehicle needs to report to the cloud and apply for path re-planning. Check content includes but is not limited to the following.

(1) Whether the task ID in the navigation information is consistent with the task ID in the path information.

(2) Whether a task destination in the navigation information is consistent with an end point in the path information. This item is optional, because in some scenarios, a platform may deliver a short navigation path to the vehicle. For example, if the vehicle needs to stop temporarily because there is an obstacle vehicle in front of the vehicle, a path from the current location to a temporary parking point is first delivered. After the obstacle vehicle leaves, path information from the temporary parking lane to a target destination may be delivered. In this scenario, the task destination in the navigation information is not necessarily consistent with the end point in the path information.

(3) Whether there is an error in location information of a planning path point, for example, a turn point exists in the path, or a point whose location changes abruptly exists in the path.

It should be understood that the path information indicates that all vehicles travel in a straight line from a critical path point 1 to a critical path point 2 and from the critical path point 2 to a critical path point 3. If the vehicle determines that coordinates of the critical path point 2 in the path information are not on a connection line between the critical path point 1 and the critical path point 3, the vehicle may determine that the critical path point 2 is a point whose location changes abruptly.

(4) Whether there is an error in time information of the path information. For example, if required time of arrival of a downstream path point is earlier than that of an upstream path point, or required time of arrival of a path point is earlier than current time, the vehicle may determine that the path information is incorrect.

(5) Whether there is an error in a driving mode of the path information.

For example, if a driving mode indicated by a lane change path in the path information is a crab mode, but yawing angles of lanes before and after the lane change are inconsistent, or the vehicle cannot be switched to the driving mode based on a maneuvering capability constraint of the vehicle, the vehicle may determine that the path information is incorrect.

In an embodiment, if the vehicle determines, through check, that the path information is incorrect, the vehicle may stop and send a check result to the cloud server.

Figure 10:
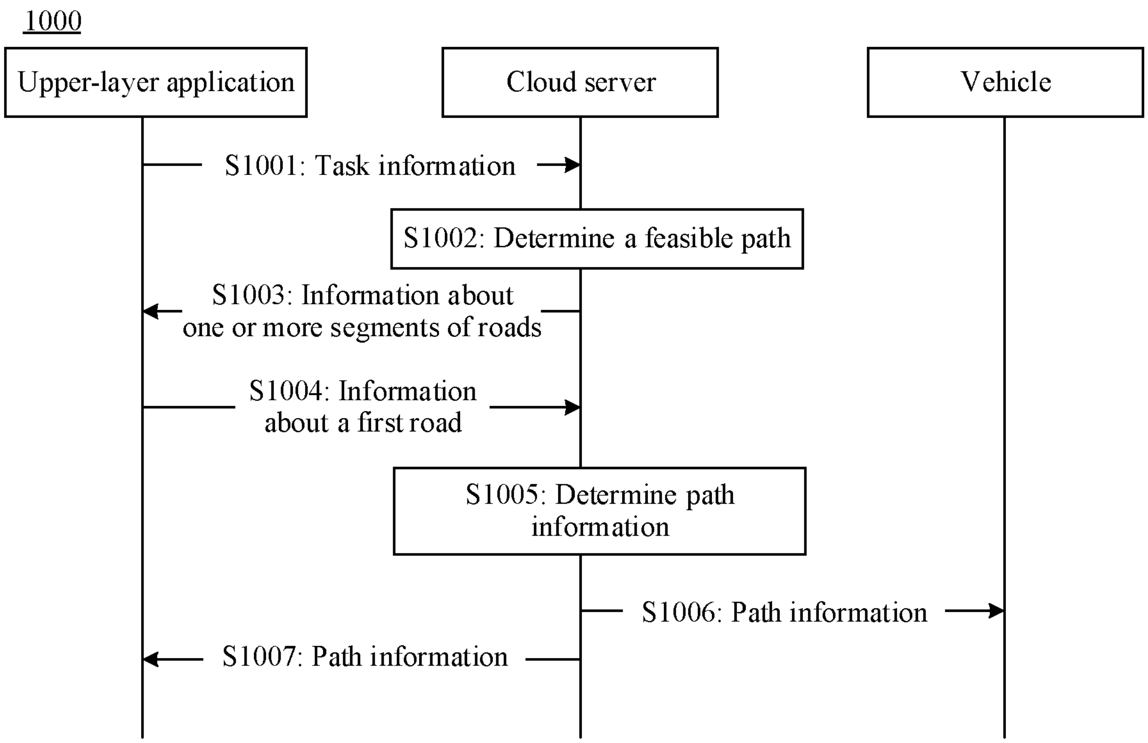
FIG. 10 is another schematic flowchart of a path planning method according to an embodiment of this application.

FIG. 10 is a schematic flowchart of a path planning method 1000 according to an embodiment of this application. The method may be performed by a vehicle, a cloud server, and an upper-layer application (or a platform). The method 1000 includes the following steps.

S1001: The upper-layer application (or the platform) sends task information to the cloud server, where the task information indicates that the vehicle needs to implement herringbone U-turn.

Figure 11:
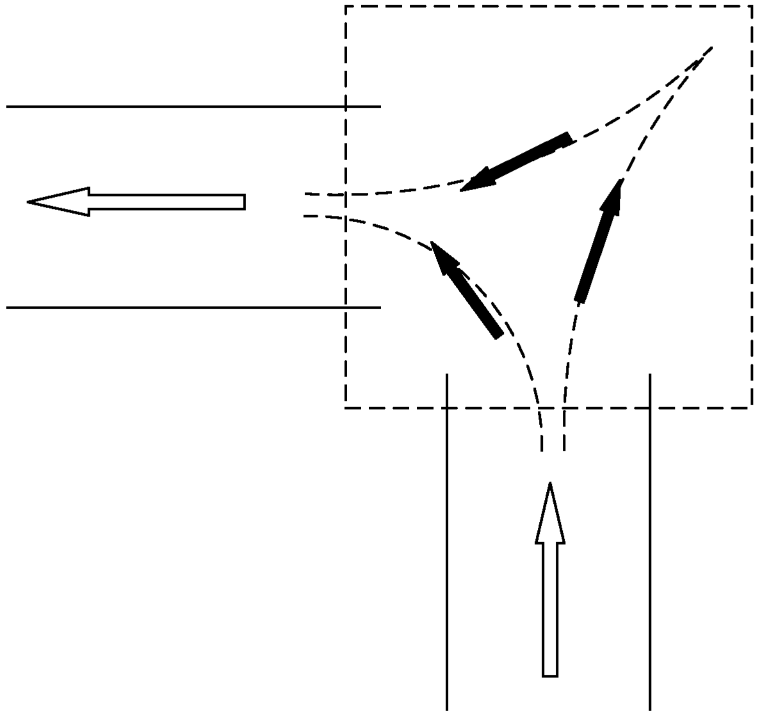
FIG. 11 is a schematic diagram of a herringbone U-turn.

FIG. 11 is a schematic diagram of a herringbone U-turn. Some connecting roads have both a natural turning function and a herringbone U-turn function. Different from a passenger vehicle, some commercial vehicles have a bidirectional traveling capability (for example, an automated guided vehicle (AGV)) in a production environment. In order to complete a special task, the vehicle is required to implement U-turn on the entire path. When planning the path, the cloud server can select a proper location for the vehicle to implement herringbone U-turn.

In an embodiment, a task purpose in the task information may include information indicating that the vehicle needs to implement herringbone U-turn.

S1002: The cloud server determines a feasible path based on the task information, where one or more segments of roads in the feasible path may be used for herringbone U-turn.

In an embodiment, the cloud server may plan the feasible path for the vehicle based on the task information and an inherent attribute of a road. The feasible path may include one or more segments of roads, and the one or more segments of roads may be used for herringbone U-turn.

S1003: The cloud server sends the feasible path and information about the one or more segments of roads in the feasible path to the upper-layer application.

After receiving the feasible path and the information about the one or more segments of roads in the feasible path, the upper-layer application may prompt, by using a UI, a user about the feasible path and the information about the one or more segments of roads in the feasible path. The user may select a segment of road from the one or more segments of roads, and the segment of road may be used for herringbone U-turn of the vehicle.

S1004: The upper-layer application sends information about a first road to the cloud server, where the first road is a road on which the vehicle performs herringbone U-turn.

In an embodiment, if the cloud server in S1002 determines that only one segment of road in the feasible path can be used for herringbone U-turn, the cloud server may alternatively directly perform S1005.

S1005: The cloud server determines path information based on the feasible path and the information about the first road.

Figure 12:
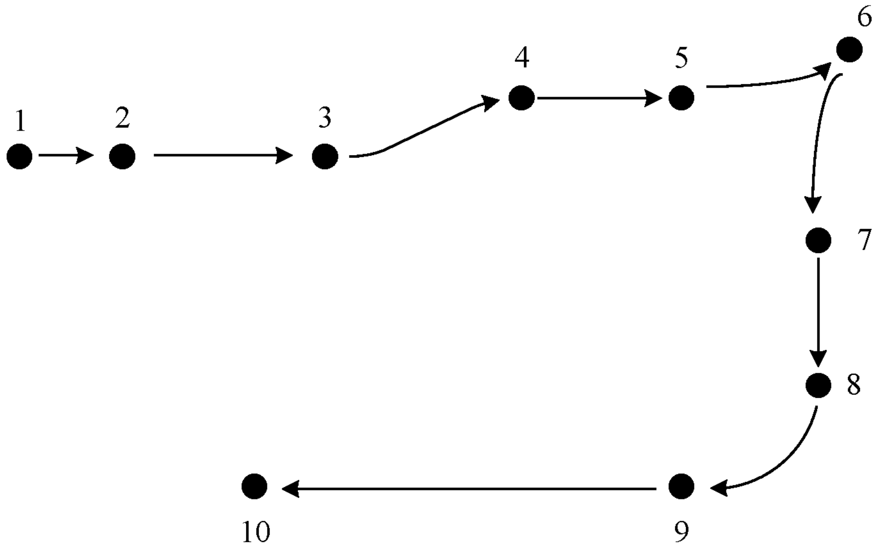
FIG. 12 is a schematic diagram in which a path planning module delivers path information to a vehicle according to an embodiment of this application.

For example, FIG. 12 is a schematic diagram in which a path planning module delivers path information to a vehicle according to an embodiment of this application. The path information shown in FIG. 12 includes critical path points 1 to 10. At each critical path point, there is usually a change in velocity or a driving mode. Critical path points 1 to 6 shown in FIG. 12 are used as an example. Information about the six critical path points may be shown in Table 2.

TABLE 2

Information about critical path points

| Critical path point | 1 | 2 | 3 | 4 | 5 | 6 |
|---|---|---|---|---|---|---|
| Location | P1 | P2 | P3 | P4 | P5 | P6 |
| Velocity | 0 | v1 | v1/NULL | v1/NULL | v2 | v2 |
| Time of arrival | t1 | t2 | t3 | t4 | t5 | t6 |
| Driving mode | STRAIGHT | STRAIGHT/ NULL | LANE CHANGE | STRAIGHT | TURN | TURN |
| Herringbone U-turn | FALSE | FALSE | FALSE | FALSE | FALSE | TRUE |

At a critical path point 6, the cloud server indicates the vehicle to perform a herringbone U-turn. When the vehicle travels to the critical path point 6, a path yawing angle at the critical path point 6 on the segment of road from a critical path point 5 to the critical path point 6 and a path yawing angle at the critical path point 6 on the segment of road from the critical path point 6 to a critical path point 7 can be checked. If a difference of path yawing angles is greater than or equal to a preset angle (for example, 180°), the vehicle may determine that the herringbone U-turn is achieved at the critical path point 6. Otherwise, the vehicle may consider that the path information is incorrect, and the vehicle may report a check result to the cloud server.

It should be understood that for the descriptions of critical path points 1 to 5, refer to the foregoing descriptions of critical path points 1 to 5 in Table 1. Details are not described herein again.

S1006: The cloud server sends the path information to the vehicle.

After receiving the path information sent by the cloud server, the vehicle may operate or pass based on the path information.

S1007: The cloud server sends the path information to the upper-layer application.

After receiving the path information, the upper-layer application may prompt the user of the path information through the UI.

It should be understood that there is no actual sequence between S1006 and S1007.

Figure 13:
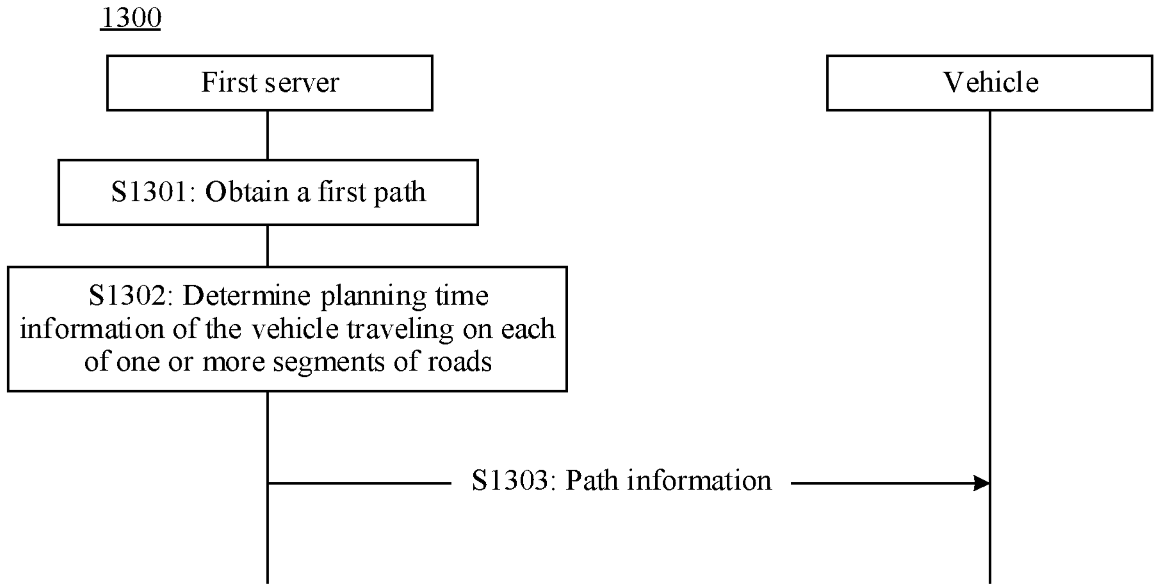
FIG. 13 is another schematic flowchart of a path planning method according to an embodiment of this application.

FIG. 13 is a schematic flowchart of a path planning method 1300 according to an embodiment of this application. The method 1300 may be performed by a first server and a vehicle, and the method 1300 includes the following steps.

S1301: The first server obtains a first path, where the first path is a path from a current location of the vehicle to a task destination, and the first path includes one or more segments of roads.

Optionally, before the first server obtains the first path, the method further includes that the first server obtains task information, where the task information includes information indicating the task destination. The task destination may be a final destination of a task, and the first path is a path from the current location of the vehicle to the final destination of the task. The task destination may alternatively include one or more waypoints or break points to reach the final destination of the task. When sending path information to the vehicle, the first server may first send a path from the current location of the vehicle to the waypoints or the break points. After the vehicle reaches these locations, the first server may continue to send, to the vehicle, a path to a next waypoint or a break point until the vehicle reaches the final destination of the task. Each time before the vehicle delivers a path that reaches a waypoint or a break point, the first server may obtain the path from the current location of the vehicle to the final destination of the task, or obtain a path from the current location of the vehicle to a next waypoint or a next break point.

Optionally, that the first server obtains task information includes that the first server receives task information sent by a second server, where the second server may be a server corresponding to the upper-layer application.

For example, in a port scenario, after the second server receives an instruction of a user, the second server sends the task information to the first server.

Optionally, that the first server obtains task information includes that the first server receives task information sent by the vehicle.

For example, in scenarios such as in a city or high-speed passing, the vehicle may send the task information to the first server after detecting the instruction of the user.

Optionally, a second path and the first path may be a same path.

Optionally, the second path may include the first path.

Optionally, the vehicle may send information such as a current location of the vehicle, a yawing angle, and velocity to the first server in real time. For example, when at least one parameter of the current location of the vehicle, the yawing angle, or the velocity changes, the vehicle may report a changed parameter to the first server. For another example, the vehicle may send the foregoing parameter to the first server according to a preset periodicity.

S1302: The first server determines planning time information in which the vehicle travels on each of the one or more segments of roads, and a total quantity of vehicles on each segment of road is less than or equal to a capacity of each segment of road when the vehicle travels on each segment of road.

In this embodiment of this application, after obtaining the first path, the first server may determine, based on a capacity of the one or more segments of roads in the first path, the planning time information for the vehicle to travel on the one or more segments of roads. The first server may determine, based on path and time planning of another vehicle and the capacity of the one or more segments of roads in the first path, planning time information for a current vehicle to travel on the one or more segments of roads, to avoid conflicts between a plurality of vehicles. For a specific determining process, refer to the description in S305. Details are not described herein again.

S1303: The first server sends the path information to the vehicle, where the path information includes information about at least one of the one or more segments of roads and planning time information for the vehicle to travel on the at least one segment of road.

Optionally, the information about the at least one segment of road includes lane information in which the vehicle travels on each segment of the at least one segment of road.

It should be understood that, in this embodiment of this application, after determining the path information of the vehicle, the first server may send, to the vehicle, information about all roads in the first path and planning time information in which the vehicle travels on each segment of road. Alternatively, the first server may send, to the vehicle, information about at least one segment of road in the first path and the planning time information for traveling on the at least one segment of road. For example, the at least one segment of road may include a first segment of road in the first path, or include a first segment of road and a second segment of road in the first path.

For example, the first server may carry, in the path information sent to the vehicle, information about the first segment of road in the first path and planning time information for the vehicle to travel on the first segment of road. The vehicle may travel from the current location to an end point of the first segment of road based on the path information. In this case, the vehicle may report, to the first server, that the vehicle reached the end point of the first segment of road and time information in which the vehicle reached the end point of the first segment of road. After receiving the foregoing information, the first server may continue to send, to the vehicle, information about the second segment of road in the first path and planning time information in which the vehicle travels on the second segment of road. The rest can be deduced by analogy.

For example, for the path information, refer to the information about the crucial path points shown in Table 1 or Table 2.

Optionally, the at least one segment of road includes a first road, planning time information for the vehicle to travel on the first road includes information indicating a first moment and information indicating a second moment, the first moment is a moment at which the vehicle enters the first road, and the second moment is a moment at which the vehicle leaves the first road. The method further includes, between the first moment and the second moment, if a total quantity of vehicles on the first road is greater than a capacity of the first road and a priority of the vehicle is higher than that of another vehicle, the first server indicates the other vehicle to leave the first road before the first moment, or indicates the other vehicle to enter the first road after the second moment, where the other vehicle is a vehicle that plans to travel on the first road between the first moment and the second moment.

For example, the first server determines that a vehicle 1 enters the first road at a moment $t_1$ and leaves the first road at a moment $t_2$, and the first server previously plans for a vehicle 2 to enter the first road at the moment $t_1$ and leave the first road at the moment $t_2$. If the first server determines that a capacity of the first road is 1 and a priority of the vehicle 1 is higher than a priority of the vehicle 2, the first server may indicate the vehicle 2 to leave the first road before the moment $t_1$, or indicate the vehicle 2 to enter the road after the moment $t_2$.

In an embodiment, a manner in which the first server indicates the other vehicle to leave the first road before the first moment, or indicates the other vehicle to enter the first road after the second moment may be that the first server sends new path information to the other vehicle.

In an embodiment, after receiving an instruction of the first server, the other vehicle may determine driving information of the other vehicle by itself. For example, the other vehicle may increase its velocity to ensure that the other vehicle leaves the first road before the first moment, or the other vehicle may reduce its velocity to ensure that the other vehicle enters the first road after the second moment.

Optionally, the planning time information for the vehicle to travel on each segment of road includes a moment at which the vehicle enters each segment of road and a moment at which the vehicle leaves each segment of road, or the planning time information for the vehicle to travel on each segment of road includes a moment at which the vehicle enters each segment of road and velocity information of the vehicle on each segment of road, or the planning time information for the vehicle to travel on each segment of road includes a moment at which the vehicle leaves each segment of road and velocity information of the vehicle on each segment of road.

Optionally, the path information further includes information about a driving mode of the vehicle on the at least one segment of road, and the driving mode includes at least one of a straight-line driving mode, a natural turning mode, or a crab mode.

Optionally, that the first server obtains a first path includes that the first server determines, based on a passing class of the vehicle and/or a type of the vehicle, a road on which the vehicle is allowed to travel, where the road on which the vehicle is allowed to travel includes the one or more segments of roads, and the first server obtains the first path based on the road on which the vehicle is allowed to travel.

For example, the passing class of the vehicle may be included in the task information. The first server may determine, based on the passing class of the vehicle, the road on which the vehicle is allowed to travel, where the passing class of the vehicle may be greater than or equal to a road level on which the vehicle is allowed to travel. For example, the first server may determine that the vehicle may travel on roads 1 to 9, where roads 1 to 3 form a path 1, roads 4 to 6 form a path 2, and roads 7 to 9 form a path 3. The path 1, the path 2, and the path 3 may be paths from the current location of the vehicle to the task destination. The vehicle may select a path from the path 1, the path 2, and the path 3 as the first path.

For example, the first server may send the path 1, the path 2, and the path 3 to the vehicle, and the vehicle may prompt the three paths by using an HMI. When the vehicle detects that the user selects a path, the vehicle may send information about the path to the first server. Further, the first server may determine, with reference to a capacity of a road on the path, planning time information in which the vehicle travels on each segment of road on the path.

For example, the type of the vehicle may be included in the task information, and the first server may determine, based on the type of the vehicle, the road on which the vehicle is allowed to travel. For example, if the type of the vehicle is a special vehicle like an ambulance or a fire truck, the first server may determine that all roads from the current location of the vehicle to the task destination are available to pass.

For example, the first server stores a mapping relationship between a vehicle type and a vehicle level. When obtaining the vehicle type, the first server may determine the vehicle level. If the vehicle level is greater than or equal to a level of a road, the first server may determine that the vehicle is allowed to travel on the road.

In an embodiment, that the first server obtains a first path may be that the first server obtains the first path when receiving the task information, or may be that the first server obtains the first path in advance.

For example, the task destination of the vehicle may be a location 1, and the first server may obtain the second path based on current location information of the vehicle and the location 1, where the second path is a path from the current location of the vehicle to the location 1. In this case, if the first server determines that a fault point exists in the second path, the first server may divide the second path into a first path and a third path, where the first path is a path from the fault point to the location 1, and the third path is a path from the current location of the vehicle to the fault point. The first server may deliver path information corresponding to the third path to the vehicle. After receiving the path information corresponding to the third path, the vehicle may travel to the fault point based on the path information corresponding to the third path.

When the first server determines that the vehicle travels to the fault point and a fault at the fault point disappears at this time, the server may deliver path information corresponding to the first path to the vehicle. The path information corresponding to the first path may include information about at least one of the one or more segments of roads and planning time information for the vehicle to travel on the at least one segment of road.

Optionally, that the first server obtains a first path includes that the first server sends, information about the task destination to a third server, and the first server obtains the information about the first path that is obtained by the third server based on the task destination.

Optionally, the third server may be a map server.

Optionally, that the first server stores map information and the first server obtains a second path based on the task destination includes that the first server determines the second path based on the stored map information and the task destination.

It should be understood that in this embodiment of this application, the first server and the third server may be located in a same server, or may be located in different servers. This is not limited in this application.

Optionally, the path information further includes information indicating the vehicle to perform a herringbone U-turn on a second road, and the at least one segment of road includes the second road.

For example, if the first server determines that the task information includes the information indicating that the vehicle needs to perform a herringbone U-turn, after obtaining the first path, the vehicle may determine, from a plurality of segments of roads in the first path, roads that may be used by the vehicle to perform a herringbone U-turn. If the plurality of segments of roads support the herringbone U-turn, the first server may send information about the plurality of segments of roads that support the herringbone U-turn to the second server (or the vehicle), so that the second server (or the vehicle) reminds the user to select a segment of road to perform a herringbone U-turn. After detecting an operation of selecting a segment of road by the user, the second server (or the vehicle) may send information about the segment of road to the first server, so that the first server may carry, in the path information sent to the vehicle, information indicating a road on which the vehicle performs a herringbone U-turn. Alternatively, if only one segment of road in the first path supports the herringbone U-turn, the first server may directly carry, in the path information sent to the vehicle, information indicating a road on which the vehicle performs a herringbone U-turn.

In this embodiment of this application, the path information delivered by the server to the vehicle may include information about one or more segments of roads and planning time information for the vehicle to travel on the one or more segments of roads, to control traveling of the vehicle from two dimensions: a road and time. This helps avoid conflicts between vehicles, improve passing efficiency of vehicles, further help implement orderly operations or passing by vehicles.

Optionally, the method further includes that the vehicle prompts, to the user, planning time information for the vehicle to travel on the at least one segment of road.

For example, the vehicle may prompt, to the user by using a sound or an HMI, the planning time information for the vehicle to travel on the at least one segment of road.

For example, when the vehicle travels on a segment of road in the first path, the vehicle may display, by using the HMI, a moment at which the vehicle reaches a start point of the segment of road, velocity information for traveling on the segment of road, and a moment at which the vehicle reaches an end point of the segment of road.

Optionally, the path information includes first identification information, and before the vehicle receives path information sent by the first server, the method further includes that the vehicle sends task information to the first server, where the task information includes information indicating the task destination, and the vehicle receives second identification information sent by the first server based on the task information, and the method includes the following. If the first identification information matches the second identification information, the vehicle travels based on the path information.

For example, the first server may send a first ID to the vehicle after receiving the task information sent by the vehicle. After determining the path information, the first server may carry a second ID in the path information sent to the vehicle. The vehicle may check the first ID and the second ID. If the first ID matches the second ID, the vehicle may travel based on the path information.

It should be understood that the matching between the first ID and the second ID may be understood as that the first ID is consistent with the second ID, or a third ID obtained by using a preset algorithm (for example, a preset function operation) for the first ID is consistent with the second ID, or a fourth ID obtained by using a preset algorithm (for example, a preset function operation) for the second ID is consistent with the first ID.

In this embodiment of this application, a task destination of the vehicle received by the first server may be inconsistent with a destination in the first path delivered by the first server to the vehicle (for example, there is a fault point between the current location of the vehicle and the task destination, and the vehicle carries path information from the current location of the vehicle to the fault point in the first path). The vehicle can accurately determine, based on the first identification information and the second identification information, that the path information is the path information for the vehicle, and this avoids misjudgment of the vehicle.

Optionally, the method further includes the following. If check on information about the at least one segment of road and/or the planning time information for the vehicle to travel on the at least one segment of road succeeds, the vehicle travels based on the path information.

It should be understood that for a process of checking, by the vehicle, the information about the at least one segment of road and/or the planning time information for the vehicle to travel on the at least one segment of road, refer to the description in S904. Details are not described herein again.

Figure 14:
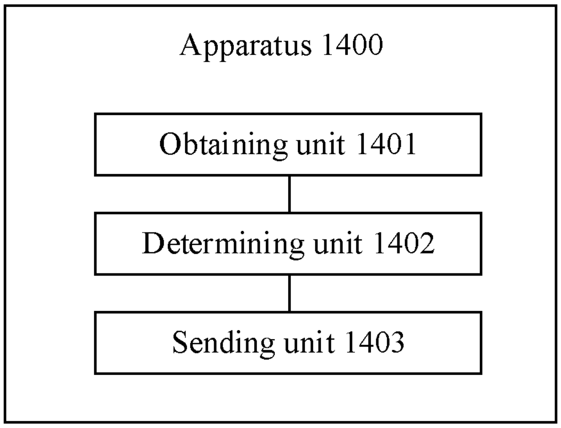
FIG. 14 is a schematic block diagram of an apparatus according to an embodiment of this application.

FIG. 14 is a schematic block diagram of an apparatus 1400 according to an embodiment of this application. The apparatus 1400 includes an obtaining unit 1401 configured to obtain a first path, where the first path is a path from a current location of a vehicle to a task destination, and the first path includes one or more segments of roads, a determining unit 1402 configured to determine planning time information in which the vehicle travels on each of the one or more segments of roads, and a total quantity of vehicles on each segment of road is less than or equal to a capacity of each segment of road when the vehicle travels on each segment of road, and a sending unit 1403 configured to send path information to the vehicle, where the path information includes information about at least one of the one or more segments of roads and planning time information for the vehicle to travel on the at least one segment of road.

Optionally, the obtaining unit 1401 is further configured to obtain task information before obtaining the first path, where the task information includes information indicating the task destination, and obtaining a second path based on the task destination, where the second path is associated with the first path.

Optionally, the at least one segment of road includes a first road, planning time information for the vehicle to travel on the first road includes information indicating a first moment and information indicating a second moment, the first moment is a moment at which the vehicle enters the first road, and the second moment is a moment at which the vehicle leaves the first road. The sending unit is further configured to, between the first moment and the second moment, if a total quantity of vehicles on the first road is greater than a capacity of the first road and a priority of the vehicle is higher than that of another vehicle, send indication information to the other vehicle, where the indication information indicates the other vehicle to leave the first road before the first moment, or indicates the other vehicle to enter the first road after the second moment, where the other vehicle is a vehicle that plans to travel on the first road between the first moment and the second moment.

Optionally, the planning time information for the vehicle to travel on the first road includes the information about the first moment and the information about the second moment, or the planning time information for the vehicle to travel on the first road includes the information about the first moment and velocity information of the vehicle on the first road, or the planning time information for the vehicle to travel on the first road includes the information about the second moment and velocity information of the vehicle on the first road.

Optionally, the path information further includes information about a driving mode of the vehicle on the at least one segment of road, and the driving mode includes at least one of a straight-line driving mode, a natural turning mode, or a crab mode.

Optionally, the obtaining unit 1401 is further configured to determine, based on a passing class of the vehicle and/or a type of the vehicle, a road on which the vehicle is allowed to travel, where the road on which the vehicle is allowed to travel includes the one or more segments of roads, and obtain the first path based on the road on which the vehicle is allowed to travel.

Optionally, the obtaining unit 1401 is further configured to send information about the task destination to a map server, and obtain information that is about the first path and that is obtained by the map server based on the task destination.

Optionally, the path information further includes information indicating the vehicle to perform a herringbone U-turn on a second road, and the at least one segment of road includes the second road.

Figure 15:
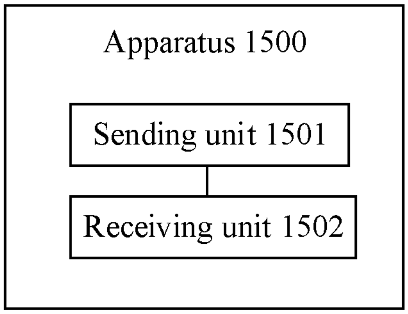
FIG. 15 is another schematic block diagram of an apparatus according to an embodiment of this application.

FIG. 15 is a schematic block diagram of an apparatus 1500 according to an embodiment of this application. As shown in FIG. 15, the apparatus 1500 includes a sending unit 1501 configured to send information of a current location of the apparatus to a server, and a receiving unit 1502 configured to receive path information sent by the server, where the path information includes information about at least one of one or more segments of roads and planning time information of the apparatus traveling on the at least one segment of road, and a first path including the one or more segments of roads is a path from the current location of the apparatus to a task destination.

Optionally, the apparatus 1500 further includes a prompting unit configured to prompt to a user, the planning time information of the apparatus traveling on the at least one segment of road.

Optionally, the path information further includes information about a driving mode of the apparatus on the at least one segment of road, and the driving mode includes at least one of a straight-line driving mode, a natural turning mode, or a crab mode.

Optionally, the path information includes information indicating the apparatus to perform a herringbone U-turn on a second road, and the at least one segment of road includes the second road.

Optionally, the path information includes first identification information, and the sending unit 1501 is further configured to, before receiving the path information sent by the server, send task information to the server, where the task information includes information indicating the task destination.

The receiving unit 1502 is further configured to receive second identification information sent by the server based on the task information.

The apparatus further includes a check unit 1503 configured to, before the apparatus travels based on the path information, determine that the first identification information matches the second identification information.

Optionally, the apparatus further includes the check unit 1503 configured to, before the apparatus travels based on the path information, determine that check on the information about the at least one segment of road and/or the planning time information of the apparatus traveling on the at least one segment of road succeeds.

An embodiment of this application further provides an apparatus. The apparatus includes a processing unit and a storage unit. The storage unit is configured to store instructions, and the processing unit executes the instructions stored in the storage unit, so that the apparatus performs the steps performed by the first server in the foregoing embodiments. Alternatively, the processing unit executes the instructions stored in the storage unit, so that the apparatus performs the steps performed by the vehicle in the foregoing embodiments.

Optionally, if the apparatus is in a vehicle, the processing unit may be the processor 151 shown in FIG. 1, and the storage unit may be the memory 152 shown in FIG. 1. The memory 152 may be a storage unit (for example, a register or a cache) in a chip, or may be a storage unit (for example, a read-only memory and a random access memory) located outside the chip in the vehicle.

An embodiment of this application further provides a computer program product, where the computer program product includes computer program code. When the computer program code runs on a computer, the computer is enabled to perform the foregoing method.

An embodiment of this application further provides a server. The server may include the apparatus 1400.

An embodiment of this application further provides a vehicle. The vehicle may include the foregoing apparatus 1500.

An embodiment of this application further provides a vehicle control apparatus. The vehicle control apparatus may include the foregoing apparatus 1400. The vehicle control apparatus may be presented in a plurality of different product forms. For example, the vehicle control apparatus may be the server. The server may be a single server, or may be a server cluster including a plurality of servers. The server may be a local server. In an internet of vehicles field, the server may be further a cloud server, and may also be referred to as a cloud, a cloud end, a cloud server, a cloud controller, an internet of vehicles server, or the like. The cloud server is a general term for devices or components that have a data processing capability. For example, the cloud server may include an entity device like a host or a processor, or may include a virtual device like a virtual machine or container, or may include a chip or an integrated circuit. Optionally, the vehicle control apparatus may alternatively be a road side unit (RSU), or a chip or component in an RSU.

The vehicle control apparatus can be connected to an upper-layer application upwards. For example, an operator may configure the vehicle control apparatus by using the upper-layer application, including but not limited to configuring a function of the vehicle control apparatus, delivering task information, a control instruction, and the like. Further, the vehicle control apparatus may obtain configuration information, the task information, the control instruction, and the like from the upper-layer application, and use other information that can be obtained by the vehicle control apparatus to uniformly schedule related vehicles in a system, to improve overall operation efficiency of the vehicles.

Figure 16:
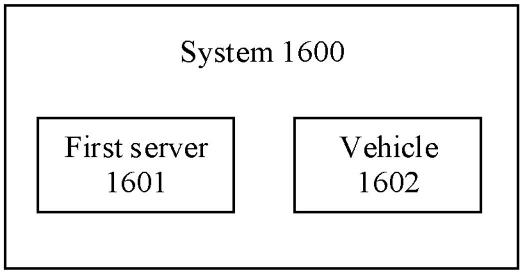
FIG. 16 is a schematic block diagram of a system according to an embodiment of this application.

FIG. 16 is a schematic block diagram of a system 1600 according to an embodiment of this application. As shown in FIG. 16, the system 1600 may include a first server 1601 and a vehicle 1602. The first server 1601 may be the first server in the foregoing embodiments, and the vehicle 1602 may be the vehicle in the foregoing embodiments.

An embodiment of this application further provides a computer-readable medium. The computer-readable medium stores program code. When the computer program code runs on a computer, the computer is enabled to perform the foregoing method.

In an implementation process, the steps of the foregoing methods may be completed by using an integrated logic circuit of hardware in a processor or instructions in a form of software. The method disclosed with reference to embodiments of this application may be directly performed and completed by a hardware processor, or may be performed and completed by using a combination of hardware in the processor and a software module. The software module may be located in a mature storage medium in this field, like a random access memory, a flash memory, a read-only memory, a programmable read-only memory, an electrically erasable programmable memory, or a register. The storage medium is located in the memory, and the processor reads information in the memory, and completes the steps of the foregoing methods in combination with hardware of the processor. To avoid repetition, details are not described herein again.

It should be understood that, the processor in embodiments of this application may be a CPU, or may be another general-purpose processor, a digital signal processor (DSP), an ASIC, an FPGA, or another programmable logic device, discrete gate or transistor logic device, discrete hardware component, or the like. The general-purpose processor may be a microprocessor, or the processor may be any conventional processor, or the like.

It should be further understood that, in embodiments of this application, the memory may include a read-only memory and a random access memory, and provide instructions and data for the processor.

In embodiments of this application, “first”, “second”, and various numeric numbers are merely used to distinguish for ease of description and are not intended to limit the scope of embodiments of this application. For example, “first”, “second”, and various numeric numbers are used to distinguish between different pipes, through holes, and the like.

It should be understood that the term “and/or” in this specification is merely an association relationship for describing associated objects and represents that three relationships may exist. For example, A and/or B may represent the following three cases: only A exists, both A and B exist, and only B exists. In addition, the character “/” generally indicates an “or” relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that units and algorithm steps in the examples described with reference to the embodiments disclosed in this specification may be implemented by electronic hardware or a combination of computer software and electronic hardware. Whether these functions are performed in a hardware or software manner depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the function is implemented in the form of a software function unit and sold or used as an independent product, the integrated unit may be stored in a non-transitory computer-readable storage medium. Based on such an understanding, the technical solutions of this application, or the part contributing to the conventional technology, or some of the technical solutions may be implemented in the form of a software product. The computer software product is stored in a non-transitory storage medium and includes several instructions for instructing a computer device (which may be a personal computer, a server, or a network device) to perform all or some of the steps of the methods described in embodiments of this application. The foregoing non-transitory storage medium includes any medium that can store program code, like a Universal Serial Bus (USB) flash drive, a removable hard disk, a read-only memory (ROM), a random-access memory (RAM), a magnetic disk, or an optical disc.

The foregoing descriptions are merely implementations of this application, and are not intended to limit the protection scope of this application. Any variation or replacement that is figured out by a person skilled in the art in the technical scope disclosed in this application shall fall within the protection scope of this application. Therefore, the protection scope of this application shall be subject to the protection scope of the claims.

What is claimed is:

1. A path planning method comprising:

sending first information comprising telemetry information, wherein the telemetry information comprises at least one of a current location of a vehicle, a yawing angle of the vehicle, or a velocity of the vehicle;

receiving, in response to the first information, path information comprising second information about a segment of a road and planning time information for the vehicle to travel on the segment, wherein a total quantity of vehicles on the segment is less than or equal to a capacity of the segment based on the planning time information, wherein the planning time information comprises third information indicating a first moment at which the vehicle is to enter the segment and fourth information indicating a second moment at which the vehicle is to leave the segment, wherein the path information further comprises driving mode information specifying a driving mode for the vehicle on the segment, and wherein the driving mode comprises at least one of a straight-line driving mode, a natural turning mode, or a crab mode;

receiving indication information instructing either the vehicle to leave the segment before a third moment or the vehicle to enter the segment after a fourth moment, wherein the third moment is either the same as the first moment or after the first moment, and wherein the fourth moment is either the same as the second moment or before the second moment;

obtaining, based on the segment, a path from the current location to a task destination; and controlling movement of the vehicle on the path by adjusting the velocity based on the planning time information to cause the vehicle to reach the segment of the path at a moment specified by the planning time information, and by activating the driving mode specified by the driving mode information on the segment.

2. The path planning method of claim 1, wherein the planning time information comprises a fifth moment at which the vehicle enters the segment and a sixth moment at which the vehicle leaves the segment.

3. The path planning method of claim 1, wherein the path information further comprises fifth information instructing the vehicle to perform a herringbone U-turn on the road.

4. The path planning method of claim 1, wherein the path information further comprises first identification information, wherein before receiving the path information, the path planning method further comprises:

sending task information comprising fifth information indicating the task destination; and receiving, based on the task information, second identification information, and wherein the path planning method further comprises:

identifying that the first identification information matches the second identification information; and traveling, in response to identifying that the first identification information matches the second identification information and based on the path information, the path.

5. The path planning method of claim 1, further comprising:

identifying that checking the second information or the planning time information has succeeded; and traveling, in response to identifying that checking the second information or the planning time information has succeeded and based on the path information, the path.

6. The path planning method of claim 1, wherein the vehicle is an autonomous vehicle.

7. The path planning method of claim 1, wherein, when checking of the second information or the planning time information has failed, the method further comprises:

stopping movement of the vehicle; and sending a check result indicating that the checking has failed and requesting re-planning of the path.

8. The path planning method of claim 1, wherein the driving mode information specifies a submode of the natural turning mode, and wherein the submode comprises:

a first submode in which front wheels of the vehicle and rear wheels of the vehicle rotate in different directions simultaneously;

a second submode in which the front wheels rotate and the rear wheels do not rotate; or a third submode in which the rear wheels rotate and the front wheels do not rotate.

9. An apparatus comprising:

one or more memories configured to store programming instructions; and at least one processor coupled to the one or more memories and configured to execute the programming instructions to cause the apparatus to:

receive, from a first vehicle, telemetry information comprising at least one of a current location of the first vehicle, a yawing angle of the first vehicle, or a velocity of the first vehicle;

obtain, based on the telemetry information, a path that is from the current location of the first vehicle to a task destination, wherein the path comprises a segment of a road;

determine planning time information for the first vehicle to travel on the segment by allocating, based on a capacity of the segment and an existing time window occupancy of the segment by other vehicles, a time window for the first vehicle to enter and leave the segment such that a total quantity of vehicles on the segment does not exceed the capacity at any moment within the time window, wherein the planning time information comprises second information indicating a first moment at which the first vehicle enters the segment and third information indicating a second moment at which the first vehicle leaves the segment;

determine driving mode information specifying a driving mode for the first vehicle on the segment, wherein the driving mode comprises at least one of a straight-line driving mode, a natural turning mode, or a crab mode;

identify that, between the first moment and the second moment, the total quantity of vehicles on the segment is greater than the capacity of the segment and a priority of the first vehicle is higher than that of a second vehicle;

send, to the first vehicle, path information comprising first information about the segment, the driving mode information, and the planning time information; and send, to the second vehicle and in response to identifying that, between the first moment and the second moment, the total quantity of vehicles on the segment is greater than the capacity and the priority is higher than that of the second vehicle, indication information instructing either the second vehicle to leave the segment before the first moment or the second vehicle to enter the segment after the second moment.

10. The apparatus of claim 9, wherein the at least one processor is further configured to execute the programming instructions to cause the apparatus to obtain task information before obtaining the path, and wherein the task information comprises second information indicating the task destination.

11. The apparatus of claim 9, wherein the planning time information comprises a third moment at which the first vehicle enters the segment and velocity information of the first vehicle on the segment.

12. The apparatus of claim 9, wherein the path information further comprises second information instructing the first vehicle to perform a herringbone U-turn on the road.

13. The apparatus of claim 9, wherein the first vehicle is a first autonomous vehicle and the second vehicle is a second autonomous vehicle.

14. The apparatus of claim 9, wherein the at least one processor is further configured to execute the programming instructions to cause the apparatus to determine, based on at least one of a passing class of the first vehicle or a type of the first vehicle, a road on which the first vehicle is permitted to travel before obtaining the path, wherein a road level of the road is less than or equal to the passing class of the first vehicle, and wherein the path is based on the road on which the first vehicle is permitted to travel.

15. An apparatus comprising:

one or more memories configured to store programming instructions; and at least one processor coupled to the one or more memories and configured to execute the programming instructions to cause the apparatus to:

send, to a server, first information comprising telemetry information, wherein the telemetry information comprises at least one of a current location of the apparatus, a yawing angle of the apparatus, or a velocity of the apparatus;

receive, from the server and in response to the first information, path information comprising second information about a segment of a road, driving mode information specifying a driving mode for the apparatus on the segment, wherein the driving mode comprises at least one of a straight-line driving mode, a natural turning mode, or a crab mode, and planning time information of the apparatus traveling on the segment, wherein a total quantity of vehicles on the segment is less than or equal to a capacity of the segment when the apparatus travels based on the planning time information;

obtain, based on the segment, a path from the current location to a task destination;

determine that checking of the second information or the planning time information has succeeded before traveling on the path based on the path information; and control movement of the apparatus on the path by adjusting the velocity of the apparatus based on the planning time information to cause the apparatus to reach the segment of the path at a moment specified by the planning time information, and by activating the driving mode specified by the driving mode information on the segment.

16. The apparatus of claim 15, wherein the planning time information of the apparatus traveling on the segment comprises third information indicating a first moment at which the apparatus enters the segment and fourth information indicating a second moment at which the apparatus leaves the segment, wherein the at least one processor is further configured to execute the programming instructions cause the apparatus to receive, from the server, indication information indicating either the apparatus to leave the segment before a third moment or the apparatus to enter the segment after a fourth moment, wherein the third moment is either the same as the first moment or after the first moment, and wherein the fourth moment is either the same as the second moment or before the second moment.

17. The apparatus of claim 16, wherein the path information further comprises fourth information instructing the apparatus to perform a herringbone U-turn on the road.

18. The apparatus of claim 15, wherein the path information further comprises first identification information, and wherein the at least one processor is further configured to execute the programming instructions to cause the apparatus to:

send, to the server and before receiving the path information, task information comprising third information indicating the task destination;

receive, from the server based on the task information, second identification information; and determine that the first identification information matches the second identification information before the apparatus travels the path based on the path information.

19. The apparatus of claim 15, wherein the apparatus is an autonomous vehicle.

20. The apparatus of claim 15, wherein the at least one processor is further configured to execute the programming instructions to cause the apparatus to prompt, to a user via a human-machine interaction interface, the planning time information for the apparatus to travel on the segment, wherein the planning time information comprises at least one of a moment at which the apparatus enters the segment, a velocity of the apparatus on the segment, or a moment at which the apparatus leaves the segment.

* * * * *